US009616420B2

(12) United States Patent
Chandler et al.

(10) Patent No.: US 9,616,420 B2
(45) Date of Patent: Apr. 11, 2017

(54) CATALYSTS FOR TREATING TRANSIENT $NO_x$ EMISSIONS

(71) Applicant: JOHNSON MATTHEY PUBLIC LIMITED COMPANY, London (GB)

(72) Inventors: Guy Richard Chandler, Cambridge (GB); Alexander Nicholas Michael Green, Baldock (GB); Joanne Elizabeth Melville, Withington (GB); Paul Richard Phillips, Royston (GB); Stuart David Reid, Cambourne (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/746,074

(22) Filed: Jan. 21, 2013

(65) Prior Publication Data
US 2013/0136677 A1 May 30, 2013

Related U.S. Application Data

(60) Division of application No. 13/477,305, filed on May 22, 2012, now abandoned, which is a continuation of application No. PCT/IB2010/003186, filed on Nov. 30, 2010.

(30) Foreign Application Priority Data

Nov. 30, 2009 (GB) .................. 0920927.1

(51) Int. Cl.
| | | |
|---|---|---|
| *B01J 29/06* | (2006.01) |
| *B01J 29/88* | (2006.01) |
| *B01J 29/035* | (2006.01) |
| *B01J 29/78* | (2006.01) |
| *B01J 29/74* | (2006.01) |
| *B01J 29/72* | (2006.01) |
| *B01J 29/70* | (2006.01) |
| *B01D 53/94* | (2006.01) |
| *B01J 29/00* | (2006.01) |
| *B01J 29/072* | (2006.01) |
| *B01J 29/46* | (2006.01) |
| *B01J 29/80* | (2006.01) |
| *B01J 37/02* | (2006.01) |
| *B01J 37/08* | (2006.01) |
| *B01J 37/30* | (2006.01) |
| *F01N 3/035* | (2006.01) |
| *F01N 3/08* | (2006.01) |
| *F01N 3/10* | (2006.01) |
| *F01N 3/20* | (2006.01) |
| *F01N 13/00* | (2010.01) |
| *B01J 29/76* | (2006.01) |

(52) U.S. Cl.
CPC .......... *B01J 29/88* (2013.01); *B01D 53/9418* (2013.01); *B01D 53/9422* (2013.01); *B01J 29/005* (2013.01); *B01J 29/0352* (2013.01);
*B01J 29/0354* (2013.01); *B01J 29/0356* (2013.01); *B01J 29/072* (2013.01); *B01J 29/46* (2013.01); *B01J 29/7007* (2013.01); *B01J 29/723* (2013.01); *B01J 29/7215* (2013.01); *B01J 29/743* (2013.01); *B01J 29/7415* (2013.01); *B01J 29/783* (2013.01); *B01J 29/7815* (2013.01); *B01J 29/80* (2013.01); *B01J 37/0215* (2013.01); *B01J 37/0244* (2013.01); *B01J 37/0246* (2013.01); *B01J 37/08* (2013.01); *B01J 37/30* (2013.01); *F01N 3/035* (2013.01); *F01N 3/0842* (2013.01); *F01N 3/105* (2013.01); *F01N 3/2066* (2013.01); *F01N 13/009* (2014.06); *B01D 2255/20761* (2013.01); *B01D 2255/50* (2013.01); *B01D 2258/012* (2013.01); *B01J 29/763* (2013.01); *B01J 29/7615* (2013.01); *F01N 2510/06* (2013.01); *Y02T 10/24* (2013.01)

(58) Field of Classification Search
USPC .................................. 502/64, 65, 66, 67, 69
See application file for complete search history.

(56) References Cited

U.S. PATENT DOCUMENTS

| | | | |
|---|---|---|---|
| 2002/0086793 | A1 | 7/2002 | Labarge et al. |
| 2002/0137977 | A1 | 9/2002 | Hendriksen et al. |
| 2008/0044334 | A1* | 2/2008 | Pieterse ............ 423/239.2 |

(Continued)

FOREIGN PATENT DOCUMENTS

| | | |
|---|---|---|
| EP | 0145909 A2 | 6/1985 |
| EP | 1027930 A1 | 8/2000 |

(Continued)

OTHER PUBLICATIONS

Perez-Ramirez et al., "Evolution of isomorphously substituted iron zeolites during activation: comparison of Fe-beta and Fe-ZSM-5", Journal of Catalysis, 232, pp. 318-334, 2005.*
Perez-Ramirez, J. et al., Evolution of Isomorphously Substituted Iron Zeolites During Activation: Comparison of Fe-Beta and Fe-ZSM-5, Journal of Catalysis, 2005, pp. 318-334, vol. 232(2).
Girard, J. et al., Combined Fe—Cu SCR Systems with Optimized Ammonia to NOx Ratio for Diesel NOx Control, SAE International, 2008, pp. 523-530, 2008-01-1185.

*Primary Examiner* — Elizabeth Wood

(74) *Attorney, Agent, or Firm* — Jimmie D. Johnson

(57) ABSTRACT

A heterogeneous catalyst article having at least one combination of a first molecular sieve having a medium pore, large pore, or meso-pore crystal structure and optionally containing a first metal, and a second molecular sieve having a small pore crystal structure and optionally containing a second metal, and a monolith substrate onto or within which said catalytic component is incorporated, wherein the combination of the first and second molecular sieves is a blend, a plurality of layers, and/or a plurality of zones.

14 Claims, 10 Drawing Sheets

(56) References Cited

U.S. PATENT DOCUMENTS

2008/0159936 A1* 7/2008 Zones .................. 423/213.5
2010/0189616 A1   7/2010 Hodgson et al.
2011/0305614 A1   12/2011 Stiebels et al.

FOREIGN PATENT DOCUMENTS

| EP | 1057519 A1 | 12/2000 |
|---|---|---|
| EP | 2072128 A1 | 6/2009 |
| EP | 2130605 A2 | 12/2009 |
| WO | 9929400 A1 | 6/1999 |
| WO | 9939809 A1 | 8/1999 |
| WO | 0000272 A1 | 1/2000 |
| WO | 0180978 A1 | 11/2001 |
| WO | 2008083126 A2 | 7/2008 |
| WO | 2008132452 A2 | 11/2008 |
| WO | 2009023202 A2 | 2/2009 |
| WO | 2009/099937 * | 8/2009 |
| WO | 2009099937 A1 | 8/2009 |
| WO | 2011125049 A1 | 10/2011 |

* cited by examiner

CATALYSTS FOR TREATING TRANSIENT NO$_x$ EMISSIONS

CROSS-REFERENCE TO RELATED APPLICATIONS

This application is a division of U.S. patent application Ser. No. 13/477,305 filed on May 22, 2012, which is a continuation of PCT International Application No. PCT/IB2010/003186 filed on Nov. 30, 2010, which claims priority benefit to Great Britain Patent Application No. 0920927.1 filed on Nov. 30, 2009, all of which are incorporated herein by reference.

The present invention relates to a selective catalytic reduction catalyst comprising an optionally metal-promoted molecular sieve component for converting oxides of nitrogen (NO$_x$) present in exhaust gas emitted from a mobile source, such as a vehicular lean-burn internal-combustion engine, in the presence of a nitrogenous reductant.

As used herein, the term "selective catalytic reduction" (SCR) defines the catalytic process of reducing oxides of nitrogen to dinitrogen (N$_2$) using a nitrogenous reductant. SCR is known from treating NO$_x$ emissions from industrial stationary source applications, such as thermal power plants. More recently the SCR technique has been developed for treating NO$_x$ emissions from mobile source applications, such as passenger cars, trucks and buses. A difficulty in treating NO$_x$ from mobile source applications is that the quantity of NO$_x$ present in the exhaust gas is transient, i.e. it varies with driving conditions, such as acceleration, deceleration and cruising at various speeds. The transient nature of the NO$_x$ component in the mobile application exhaust gas presents a number of technical challenges, including correct metering of nitrogenous reductant to reduce sufficient NO$_x$ without waste or emission of nitrogenous reductant to atmosphere.

In practice, SCR catalysts can adsorb (or store) nitrogenous reductant, thus providing a buffer to the appropriate supply of available reductant. Technologists use this phenomenon to calibrate appropriate nitrogenous reductant injection to exhaust gas.

So, in summary, SCR catalysts for mobile source applications broadly perform three functions: (i) convert NO$_x$ using e.g. ammonia (NH$_3$) as nitrogenous reductant; (ii) store the NH$_3$ when there is excess NH$_3$ in the gas feed; and (iii) utilise the stored NH$_3$ under conditions where there is not sufficient NH$_3$ present in the gas feed to achieve the required conversion.

For practical applications, like treating NO$_x$ emissions from a mobile NO$_x$ source, such as a motor vehicle, where the feed gas conditions are rapidly changing, a desirable SCR catalyst has sufficient NH$_3$ storage capacity at a given temperature (to ensure any excess NH$_3$ is not "slipped" past the catalyst and to allow conversion to continue if NH$_3$ is not present in the feed) and high activity independent of the fraction of NH$_3$ fill level (fill level is defined relative to a saturated NH$_3$ storage capacity). The NH$_3$ fill level can be expressed as the amount of NH$_3$ (for example in grams) present on the complete catalyst (for example in liters) relative to a maximum fill level at a given set of conditions. NH$_3$ adsorption can be determined according to methods known in the art, such as Langmuir absorption. It will be understood that the fill level of all SCR catalysts is not directly proportional to the maximal NO$_x$ conversion activity of the SCR catalyst, i.e. it does not follow that NO$_x$ conversion activity increases to a maximum at 100% ammonia fill level. In fact, specific SCR catalysts can show maximal NO$_x$ conversion rates at a fill level of <100%, such as <90%, <80%, <50% or <30%.

The activity of a SCR catalyst can depend on the amount of NH$_3$ to which the entire catalyst monolith has been exposed. Molecular sieve-based SCR catalysts can store ammonia, and the amount of storage capacity depends, among others, on the temperature of the gas stream and the catalyst, the feed gas composition, the space velocity, particularly the NO:NO$_2$ ratio etc. The catalyst activity at the onset of exposure of the catalyst to NH$_3$ can be substantially lower than the activity when the catalyst has a relatively high exposure or saturated exposure to NH$_3$. For practical vehicle applications, this means the catalyst needs to be pre-loaded with an appropriate NH$_3$ loading to ensure good activity. However, this requirement presents some significant problems. In particular, for some operating conditions, it is not possible to achieve the required NH$_3$ loading; and this pre-loading method has limitations because it is not possible to know what the engine operating conditions will be subsequent to pre-loading. For example, if the catalyst is pre-loaded with NH$_3$ but the subsequent engine load is at idle, NH$_3$ may be slipped to atmosphere. Hence, in practical applications the amount of NH$_3$ pre-stored has to be lower than is optimal to ensure that there is limited slip of NH$_3$ if the engine is operated in a high load condition that needs NH$_3$ pre-loading instead of a lower load condition.

SCR catalysts for use on mobile applications such as automotive, are required to operate at low temperature whilst also being tolerant to hydrocarbons. Low temperature operation usually means that there is very little NO$_2$ in the feed gas, which favours the use of copper-based SCR catalysts. However, iron-based SCR catalysts are typically very good at treating approximately 50:50 NO:NO$_2$ gas feeds and are also good under high temperature conditions that may be experienced should an exhaust system contain a catalysed soot filter (CSF) and the system is arranged so that the CSF is regenerated (i.e. collected particulate matter is combusted) periodically by engineering forced high temperature conditions.

WO 2008/132452 discloses a method of converting nitrogen oxides in a gas, such as an exhaust gas of a vehicular lean-burn internal combustion engine, to nitrogen by contacting the nitrogen oxides with a nitrogenous reducing agent in the presence of a molecular sieve catalyst containing at least one transition metal, wherein the molecular sieve is a small pore zeolite containing a maximum ring size of eight tetrahedral atoms, wherein the at least one metal is selected from the group consisting of Cr, Mn, Fe, Co, Ce, Ni, Cu, Zn, Ga, Mo, Ru, Rh, Pd, Ag, In, Sn, Re, Ir and Pt. Suitable small pore molecular sieves include (using the three-letter code recognised by the Structure Commission of the International Zeolite Association) CHA, including SSZ-13 and SAPO-34; LEV, such as Nu-3; DDR e.g. Sigma-1; and ERI, including ZSM-34. Broadly, we have found that SCR catalysts for use in the method of WO 2008/132452 show a maximum NO$_x$ conversion at relatively high fill level.

WO '452 explains certain drawbacks to using ZSM-5 and Beta zeolites for converting NO$_x$ in exhaust gases emitted by mobile sources, such as vehicles, including that they are susceptible to dealumination during high temperature hydrothermal ageing resulting in a loss of acidity, especially with Cu/Beta and Cu/ZSM-5 catalysts; both Beta- and ZSM-5-based catalysts are also affected by hydrocarbons which become adsorbed on the catalysts at relatively low temperatures (known as "coking") which hydrocarbons can be oxidised subsequently as the temperature of the catalytic system is raised generating a significant exotherm, which can thermally damage the catalyst. This problem is particularly acute in vehicular diesel applications where significant quantities of hydrocarbon can be adsorbed on the catalyst during cold-start. Coking can also reduce catalytic activity because active catalyst sites can become blocked.

According to WO '452, transition metal-containing small pore molecular sieve-based SCR catalysts demonstrate significantly improved $NO_x$ reduction activity than the equivalent transition metal-containing medium, large or meso-pore molecular sieve catalysts, transition metal-containing small pore molecular sieve catalysts, especially at low temperatures. They also exhibit high selectivity to $N_2$ (e.g. low $N_2O$ formation) and good hydrothermal stability. Furthermore, small pore molecular sieves containing at least one transition metal are more resistant to hydrocarbon inhibition than larger pore molecular sieves.

During testing of certain SCR catalysts disclosed in WO 2008/132452 for reducing $NO_x$ with nitrogenous reductants (urea, an $NH_3$ precursor) it was discovered that the transient response of the catalysts was sub-optimal for treating $NO_x$ in transient vehicular exhaust gas. That is, the ability of the SCR catalysts to treat $NO_x$ in the transiently changing exhaust gas composition was less than desirable.

SAE 2008-01-1185 discloses a selective catalytic reduction catalyst comprising separate iron zeolite and copper zeolite catalysts arranged in zones coated one behind the other on a flow-through substrate monolith with the iron zeolite zone disposed upstream of the copper zeolite zone. No details are given regarding the zeolites used. Results for transient response (shown in FIG. 17) for the combined iron zeolite/copper zeolite catalyst compared unfavourably to the use of copper zeolite alone.

We have now discovered, very surprisingly, that combinations of transition metal/molecular sieve, e.g. zeolite, catalysts are more active for $NO_x$ conversion but also have relatively fast transient response. We have also found that combinations of iron molecular sieve catalysts can give good activity as well as being hydrocarbon tolerant.

According to one aspect, the invention provides a heterogeneous catalyst article comprising (a) a catalytic component comprising a combination of a first molecular sieve having a medium pore, large pore, or meso-pore crystal structure and optionally containing about 0.01 to about 20 weight percent of a first metal, and a second molecular sieve having a small pore crystal structure and optionally containing about 0.01 to about 20 weight percent of a second metal, wherein said first and second metals are exchanged or free with respect to the molecular sieve's crystalline frame work and are independently selected from the group consisting of Cr, Mn, Fe, Co, Ce, Ni, Cu, Zn, Ga, Mo, Ru, Rh, Pd, Pt, Ag, In, Sn, Re, and Ir; and (b) a monolith substrate onto or within which said catalytic component is incorporated, wherein said combination of the first and second molecular sieves is selected from the group consisting of a blends, a plurality of layers, and a plurality of zones.

Types of combinations of catalysts that are useful in the present invention include blends of two or more catalysts, a plurality of layers wherein each layer consisting of a single catalyst, and a plurality of zones, wherein each zone consists of a single catalyst. The combinations are characterized by properties that are not obtainable by any of their constituent parts acting independently of the combination. Turning to FIGS. 4a-4d, shown are certain embodiments of different combinations according to the present invention. FIG. 4a shows of a blend 100 comprising a blend of two molecular sieves 104 coated on a substrate 102. As used herein, the term "blend", with respect to molecular sieves means a volume of two or more molecular sieves having approximately the same proportions relative to one another throughout the volume. Also shown is an embodiment of a plurality of zones 110 comprising a first zone consisting of a first molecular sieve 116 and a second zone comprising a second molecular sieve 118, wherein the first and second zones are coated on a substrate 102 and are adjacent to each other and to said monolith substrate. The direction 114 of exhaust gas flow is also shown. In FIG. 4c, shown is an embodiment of a plurality of layers 120 comprising first layer 116 and a second layer 118, wherein the second layer is adjacent to both said first layer and the substrate and is between the first layer and the substrate. FIG. 4d shows two combinations 130, wherein the first combination is two zones (molecular sieve 116 and blend 104) and the second combination is blend 104. For embodiments that utilize two or more combinations, the molecular sieves for each combination are independently selected. Although not shown in the figures, other multiple combinations are within the scope of the invention as well. For example, an arrangement similar to that of FIG. 4d, but instead of a blend, the second combination could be a plurality of layers. Other multiple combinations include the use of a blend as one or more layers; the use of layers as one or more zones; and the like. When multiple combinations are used, the order of combinations with respect to exhaust gas flow through the catalyst component is not particularly limited. However, it is highly preferred that at least one medium, large, or meso-pore molecular sieve always be disposed upstream of any small pore molecular sieves.

The combinations preferably have a majority of the first molecular sieve component relative to the second molecular sieve component. In certain embodiments, combination comprises the first molecular sieve and the second molecular sieve in a first molecular sieve: second molecular sieve weight ratio of about 0.1 (i.e., 1:10) to about 1 (i.e., (1:1). In certain embodiments, the weight ratio of first molecular sieve to second molecular sieve is about 0.25 to about 0.50. In certain embodiments, the weight ratio of first molecular sieve to second molecular sieve is about 0.3 to about 0.4.

According to another aspect provided is a catalyst for selectively catalysing the conversion of oxides of nitrogen using a nitrogenous reductant in a feed gas whose composition, flow rate and temperature are each changeable temporally, which catalyst comprising a combination of a first molecular sieve component and a second molecular sieve component, wherein in a direct comparison tested on the Federal Test Procedure (FTP) 75 cycle the catalyst has a higher cumulative conversion of $NO_x$ at equal or lower $NH_3$ slip than either molecular sieve component taken alone.

In particular, we have observed in at least one embodiment a synergic relationship between the first molecular sieve component and the second molecular sieve component which can be used to improve a transient response to $NO_x$ conversion of a SCR catalyst comprising molecular sieve, e.g. a small pore molecular sieve while retaining the advantages of using the small pore molecular sieve as a component in a SCR catalyst. A "catalyst for selectively catalysing the reduction of oxides of nitrogen in a feed gas with a nitrogenous reductant" shall be referred to herein as a "selective catalytic reduction" (or "SCR") catalyst. For the avoidance of doubt, it is intended that SCR catalysts containing combinations of three or more molecular sieves fall within the scope of the present invention.

In a preferred embodiment, the catalyst has a higher cumulative conversion of $NO_x$ at equal or lower $NH_3$ slip than either molecular sieve component taken alone where the cumulative molar $NO:NO_2$ ratio in feed gas entering said catalyst is equal to or less than 1. In certain other preferred embodiments, the $NO:NO_2$ ratio in feed exhaust gas stream is about 0.8 to about 1.2. In certain other preferred embodiments, the $NO:NO_2$ ratio in feed exhaust gas stream is less than about 0.3, while in other preferred embodiments, the ratio is greater than about 3.

In a further preferred embodiment, the catalyst has a higher cumulative conversion of $NO_x$ to dinitrogen at equal or lower $NH_3$ slip than either molecular sieve component taken alone.

This invention significantly improves catalyst activity so that higher activity is obtained at lower $NH_3$ exposures (low exposure relative to the saturated storage capacity of the catalyst) compared to current state-of-the-art SCR catalysts. The rate of increase of activity from zero ammonia exposure to saturated ammonia exposure is referred to as the 'transient response'.

In one embodiment, the first molecular sieve component achieves the maximum $NO_x$ conversion at a lower $NH_3$ fill level for the conditions selected than the second molecular sieve component. For example, the ammonia fill level of the first molecular sieve component can be in the range of 10-80%, such as 20-60% or 30-50%.

The first and second molecular sieves can be selected independently from zeolites and non-zeolite molecular sieves. "Zeolite" according to the International Zeolite Association, is generally considered to be an alumino-silicate, whereas a "non-zeolite molecular sieve" can be a molecular sieve of the same Framework Type (or crystal structure) as the corresponding zeolite, but having one or more non-aluminium/non-silicon cations present in its crystal lattice, e.g. phosphorus, both cobalt and phosphorus, copper or iron. So, for example, SSZ-13 is a zeolite of Framework Type Code CHA, whereas SAPO-34 is a silico-aluminophosphate non-zeolite molecular sieve sharing the same CHA Framework Type Code. Particularly preferred are iron-containing aluminosilicate zeolites (non-zeolite molecular sieves as defined herein) such as Fe-containing ZSM5, Beta, CHA or FER disclosed for example in WO2009/023202 and EP2072128A1, which are hydrothermally stable and have relatively high SCR activity. Advantageously we have also found that in certain embodiments catalysts comprising these iron-containing aluminosilicate zeolites produce little or no ammonium nitrate, and exhibit relatively high selectivity, e.g. low $N_2O$. Typical $SiO_2/Al_2O_3$ mole ratios for such materials are 30 to 100 and $SiO_2/Fe_2O_3$ of 20 to 300 such as 20 to 100.

In preferred embodiments, the first (zeolitic or non-zeolitic) molecular sieve component can be a small pore molecular sieve containing a maximum ring size of eight (8) tetrahedral atoms, optionally selected from any set out in Table 1. Optionally, the second (zeolitic or non-zeolitic) molecular sieve component also can be a small pore molecular sieve containing a maximum ring size of eight (8) tetrahedral atoms and can be selected independently of the first molecular sieve component from any set out in Table 1.

TABLE 1

Details of small pore molecular sieves with application in the present invention

| Framework Type (by Framework Type Code) | Type material* and illustrative isotypic framework structures | Dimensionality | Pore size (Å) | Additional info |
|---|---|---|---|---|
| ACO | *ACP-1 | 3D | 3.5 × 2.8, 3.5 × 3.5 | Ring sizes - 8, 4 |
| AEI | *AlPO-18 [Co—Al—P—O]-AEI SAPO-18 SIZ-8 SSZ-39 | 3D | 3.8 × 3.8 | Ring sizes - 8, 6, 4 |
| AEN | *AlPO-EN3 AlPO-53(A) AlPO-53(B) [Ga—P—O]-AEN CFSAPO-1A CoIST-2 IST-2 JDF-2 MCS-1 MnAPO-14 Mu-10 UiO-12-500 UiO-12-as | 2D | 4.3 × 3.1, 2.7 × 5.0 | Ring sizes - 8, 6, 4 |
| AFN | *AlPO-14 \|(C₃N₂H₁₂)—\| [Mn—Al—P—O]-AFN GaPO-14 | 3D | 1.9 × 4.6, 2.1 × 4.9, 3.3 × 4.0 | Ring sizes - 8, 6, 4 |
| AFT | *AlPO-52 | 3D | 3.8 × 3.2, 3.8 × 3.6 | Ring sizes - 8, 6, 4 |
| AFX | *SAPO-56 MAPSO-56, M = Co, Mn, Zr SSZ-16 | 3D | 3.4 × 3.6 | Ring sizes - 8, 6, 4 |
| ANA | *Analcime AlPO₄-pollucite AlPO-24 | 3D | 4.2 × 1.6 | Ring sizes - 8, 6, 4 |

TABLE 1-continued

Details of small pore molecular sieves with application in the present invention

| Framework Type (by Framework Type Code) | Type material* and illustrative isotypic framework structures | Dimensionality | Pore size (Å) | Additional info |
|---|---|---|---|---|
| | Ammonioleucite | | | |
| | [Al—Co—P—O]-ANA | | | |
| | [Al—Si—P—O]-ANA | | | |
| | |Cs—|[Al—Ge—O]-ANA | | | |
| | |Cs—|[Be—Si—O]-ANA | | | |
| | |Cs$_{16}$|[Cu$_8$Si$_4$O$_{96}$]-ANA | | | |
| | |Cs—Fe|[Si—O]-ANA | | | |
| | |Cs—Na—(H$_2$O)| | | | |
| | [Ga—Si—O]-ANA | | | |
| | [Ga—Ge—O]-ANA | | | |
| | |K—|[B—Si—O]-ANA | | | |
| | |K—|[Be—B—P—O]-ANA | | | |
| | |Li—|[Li—Zn—Si—O]-ANA | | | |
| | |Li—Na|[Al—Si—O]-ANA | | | |
| | |Na—|[Be—B—P—O]-ANA | | | |
| | |(NH$_4$)—|[Be—B—P—O]-ANA | | | |
| | |(NH$_4$)—|[Zn—Ga—P—O]-ANA | | | |
| | [Zn—As—O]-ANA | | | |
| | Ca-D | | | |
| | Hsianghualite | | | |
| | Leucite | | | |
| | Na—B | | | |
| | Pollucite | | | |
| | Wairakite | | | |
| APC | *AlPO-C | 2D | 3.7 × 3.4, 4.7 × 2.0 | Ring sizes - 8, 6, 4 |
| | AlPO-H3 | | | |
| | CoAPO-H3 | | | |
| APD | *AlPO-D | 2D | 6.0 × 2.3, 5.8 × 1.3 | Ring sizes - 8, 6, 4 |
| | APO-CJ3 | | | |
| ATT | *AlPO-12-TAMU | 2D | 4.6 × 4.2, 3.8 × 3.8 | Ring sizes - 8, 6, 4 |
| | AlPO-33 | | | |
| | RMA-3 | | | |
| CDO | *CDS-1 | 2D | 4.7 × 3.1, 4.2 × 2.5 | Ring sizes - 8, 5 |
| | MCM-65 | | | |
| | UZM-25 | | | |
| CHA | *Chabazite | 3D | 3.8 × 3.8 | Ring sizes - 8, 6, 4 |
| | AlPO-34 | | | |
| | [Al—As—O]-CHA | | | |
| | [Al—Co—P—O]-CHA | | | |
| | |Co| [Be—P—O]-CHA | | | |
| | |Co$_3$ (C$_6$N$_4$H$_{24}$)$_3$H$_2$O)$_9$| | | | |
| | [Be$_{18}$P$_{18}$O$_{72}$]-CHA | | | |
| | [Co—Al—P—O]-CHA | | | |
| | |Li—Na| [Al—Si—O]-CHA | | | |
| | [Mg—Al—P—O]-CHA | | | |
| | [Si—O]-CHA | | | |
| | [Zn—Al—P—O]-CHA | | | |
| | [Zn—As—O]-CHA | | | |
| | CoAPO-44 | | | |
| | CoAPO-47 | | | |
| | DAF-5 | | | |
| | GaPO-34 | | | |
| | K-Chabazite | | | |
| | Linde D | | | |
| | Linde R | | | |
| | LZ-218 | | | |
| | MeAPO-47 | | | |
| | MeAPSO-47 | | | |
| | (Ni(deta)$_2$)-UT-6 | | | |
| | Phi | | | |
| | SAPO-34 | | | |

TABLE 1-continued

Details of small pore molecular sieves with application in the present invention

| Framework Type (by Framework Type Code) | Type material* and illustrative isotypic framework structures | Dimensionality | Pore size (Å) | Additional info |
|---|---|---|---|---|
| | SAPO-47 SSZ-13 UiO-21 Willhendersonite ZK-14 ZYT-6 | | | |
| DDR | *Deca-dodecasil 3R | 2D | 4.4 × 3.6 | Ring sizes - 8, 6, 5, 4 |
| | [B—Si—O]-DDR Sigma-1 ZSM-58 | | | |
| DFT | *DAF-2 | 3D | 4.1 × 4.1, 4.7 × 1.8 | Ring sizes - 8, 6, 4 |
| | ACP-3, [Co—Al—P—O]-DFT [Fe—Zn—P—O]-DFT [Zn—CoP—O]-DFT UCSB-3GaGe UCSB-3ZnAs UiO-20, [Mg—P—O]-DFT | | | |
| EAB | *TMA-E Bellbergite | 2D | 5.1 × 3.7 | Ring sizes - 8, 6, 4 |
| EDI | *Edingtonite | 3D | 2.8 × 3.8, 3.1 × 2.0 | Ring sizes - 8, 4 |
| | |(C$_3$H$_{12}$N$_2$)$_{2.5}$| Zn$_5$P$_5$O$_{20}$]-EDI [Co—Al—P—O]-EDI [Co—Ga—P—O]-EDI |Li—|[Al—Si—O]-EDI |Rb$_7$ Na (H$_2$O)$_3$| [Ga$_8$Si$_{12}$O$_{40}$]-EDI [Zn—As—O]-EDI K—F Linde F Zeolite N | | | |
| EPI | *Epistilbite | 2D | 4.5 × 3.7, 3.6 × 3.6 | Ring sizes - 8, 4 |
| ERI | *Erionite AlPO-17 Linde T LZ-220 SAPO-17 ZSM-34 | 3D | 3.6 × 5.1 | Ring sizes - 8, 6, 4 |
| GIS | *Gismondine | 3D | 4.5 × 3.1, 4.8 × 2.8 | Ring sizes - 8, 4 |
| | Amicite [Al—Co—P—O]-GIS [Al—Ge—O]-GIS [Al—P—O-GIS [Be—P—O]-GIS |(C$_3$H$_{12}$N$_2$)$_4$| [Be$_8$P$_8$O$_{32}$]-GIS |(C$_3$H$_{12}$N$_2$)$_4$| [Zn$_8$P$_8$O$_{32}$]-GIS [Co—Al—P—O]-GIS [Co—Ga—P—O]-GIS [Co—P—O]-GIS |Cs$_4$|[Zn$_4$B$_4$P$_8$O$_{32}$]-GIS [Ga—Si—O]GIS [Mg—Al—P—O]-GIS |(NH$_4$)$_4$|Zn$_4$B$_4$P$_8$O$_{32}$]-GIS |Rb$_4$|[Zn$_4$B$_4$P$_8$O$_{32}$]-GIS [Zn—Al—As—O]-GIS [Zn—Co—B—P—O]-GIS [Zn—Ga—As—O]-GIS [Zn—Ga—PO]-GIS Garronite Gobbinsite MAPO-43 | | | |

TABLE 1-continued

Details of small pore molecular sieves with application in the present invention

| Framework Type (by Framework Type Code) | Type material* and illustrative isotypic framework structures | Dimensionality | Pore size (Å) | Additional info |
|---|---|---|---|---|
| | MAPSO-43 | | | |
| | Na-P1 | | | |
| | Na-P2 | | | |
| | SAPO-43 | | | |
| | TMA-gismondine | | | |
| GOO | *Goosecreekite | 3D | 2.8 × 4.0, 2.7 × 4.1, 4.7 × 2.9 | Ring sizes - 8, 6, 4 |
| IHW | *ITQ-32 | 2D | 3.5 × 4.3 | Ring sizes - 8, 6, 5, 4 |
| ITE | *ITQ-3 | 2D | 4.3 × 3.8, 2.7 × 5.8 | Ring sizes - 8, 6, 5, 4 |
| | Mu-14 | | | |
| | SSZ-36 | | | |
| ITW | *ITQ-12 | 2D | 5.4 × 2.4, 3.9 × 4.2 | Ring sizes - 8, 6, 5, 4 |
| LEV | *Levyne | 2D | 3.6 × 4.8 | Ring sizes - 8, 6, 4 |
| | AlPO-35 | | | |
| | CoDAF-4 | | | |
| | LZ-132 | | | |
| | NU-3 | | | |
| | RUB-1 [B—Si—O]-LEV | | | |
| | SAPO-35 | | | |
| | ZK-20 | | | |
| | ZnAPO-35 | | | |
| KFI | ZK-5 | 3D | 3.9 × 3.9 | Ring sizes - 8, 6, 4 |
| | \|18-crown-6\| [Al—Si—O]-KFI | | | |
| | [Zn—Ga—As—O]-KFI | | | |
| | (Cs, K)-ZK-5 | | | |
| | P | | | |
| | Q | | | |
| MER | *Merlinoite | 3D | 3.5 × 3.1, 3.6 × 2.7, 5.1 × 3.4, 3.3 × 3.3 | Ring sizes - 8, 4 |
| | [Al—Co—P—O]-MER | | | |
| | \|Ba—\|[Al—Si—O]-MER | | | |
| | \|Ba—Cl—\|[Al—Si—O]-MER | | | |
| | [Ga—Al—Si—O]-MER | | | |
| | \|K—\|[Al—Si—O]-MER | | | |
| | \|NH4—\|[Be—P—O]-MER | | | |
| | K-M | | | |
| | Linde W | | | |
| | Zeolite W | | | |
| MON | *Montesommaite | 2D | 4.4 × 3.2, 3.6 × 3.6 | Ring sizes - 8, 5, 4 |
| | [Al—Ge—O]-MON | | | |
| NSI | *Nu-6(2) | 2D | 2.6 × 4.5, 2.4 × 4.8 | Ring sizes - 8, 6, 5 |
| | EU-20 | | | |
| OWE | *UiO-28 | 2D | 4.0 × 3.5, 4.8 × 3.2 | Ring sizes - 8, 6, 4 |
| | ACP-2 | | | |
| PAU | *Paulingite | 3D | 3.6 × 3.6 | Ring sizes - 8, 6, 4 |
| | [Ga—Si—O]-PAU | | | |
| | ECR-18 | | | |
| PHI | *Phillipsite | 3D | 3.8 × 3.8, 3.0 × 4.3, 3.3 × 3.2 | Ring sizes - 8, 4 |
| | [Al—Co—P—O]-PHI | | | |
| | DAF-8 | | | |
| | Harmotome | | | |
| | Wellsite | | | |
| | ZK-19 | | | |

TABLE 1-continued

Details of small pore molecular sieves with application in the present invention

| Framework Type (by Framework Type Code) | Type material* and illustrative isotypic framework structures | Dimension-ality | Pore size (Å) | Additional info |
|---|---|---|---|---|
| RHO | *Rho<br>[Be—As—O]-RHO<br>[Be—P—O]-RHO<br>[Co—Al—P—O]-RHO<br>\|H—\|[Al—Si—O]-RHO<br>[Mg—Al—P—O]-RHO<br>[Mn—Al—P—O]-RHO<br>\|Na$_{16}$Cs$_8$\|<br>[Al$_{24}$Ge$_{24}$O$_{96}$]-RHO<br>\|NH$_4$—\|[Al—Si—O]-RHO<br>\|Rb—\|[Be—As—O]-RHO<br>Gallosilicate ECR-10<br>LZ-214<br>Pahasapaite | 3D | 3.6 × 3.6 | Ring sizes - 8, 6, 4 |
| RTH | *RUB-13<br><br>SSZ-36<br>SSZ-50 | 2D | 4.1 × 3.8,<br>5.6 × 2.5 | Ring sizes - 8, 6, 5, 4 |
| SAT | *STA-2 | 3D | 5.5 × 3.0 | Ring sizes - 8, 6, 4 |
| SAV | *Mg-STA-7<br><br>Co-STA-7<br>Zn-STA-7 | 3D | 3.8 × 3.8,<br>3.9 × 3.9 | Ring sizes - 8, 6, 4 |
| SBN | *UCSB-9<br>SU-46 | 3D | TBC | Ring sizes - 8, 4, 3 |
| SIV | *SIZ-7 | 3D | 3.5 × 3.9,<br>3.7 × 3.8,<br>3.8 × 3.9 | Ring sizes - 8, 4 |
| THO | *Thomsonite<br><br>[Al—Co—P—O]-THO<br>[Ga—Co—P—O]-THO<br>\|Rb$_{20}$\|[Ga$_{20}$Ge$_{20}$O$_{80}$]-THO<br>[Zn—Al—As—O]-THO<br>[Zn—P—O]-THO<br>[Ga—Si—O]-THO)<br>[Zn—Co—P—O]-THO | 3D | 2.3 × 3.9,<br>4.0 × 2.2,<br>3.0 × 2.2 | Ring sizes - 8, 4 |
| TSC | *Tschörtnerite | 3D | 4.2 × 4.2,<br>5.6 × 3.1 | Ring sizes - 8, 6, 4 |
| UEI | *Mu-18 | 2D | 3.5 × 4.6,<br>3.6 × 2.5 | Ring sizes - 8, 6, 4 |
| UFI | *UZM-5 | 2D | 3.6 × 4.4,<br>3.2 × 3.2 (cage) | Ring sizes - 8, 6, 4 |
| VNI | *VPI-9 | 3D | 3.5 × 3.6,<br>3.1 × 4.0 | Ring sizes - 8, 5, 4, 3 |
| YUG | *Yugawaralite<br><br>Sr-Q | 2D | 2.8 × 3.6,<br>3.1 × 5.0 | Ring sizes - 8, 5, 4 |
| ZON | *ZAPO-M1<br><br>GaPO-DAB-2<br>UiO-7 | 2D | 2.5 × 5.1,<br>3.7 × 4.4 | Ring sizes - 8, 6, 4 |

In one embodiment, the small pore molecular sieves can be selected from the group of Framework Type Codes consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON.

Small pore molecular sieves with particular application for treating NO$_x$ in exhaust gases of lean-burn internal combustion engines, e.g. vehicular exhaust gases are set out in Table 2.

TABLE 2

Preferred small pore molecular sieves for use in the SCR catalyst according to the invention.

| Structure | Molecular Sieve |
|---|---|
| CHA | SAPO-34 |
|  | AlPO-34 |
|  | SSZ-13 |
| LEV | Levynite |
|  | Nu-3 |
|  | LZ-132 |

TABLE 2-continued

Preferred small pore molecular sieves
for use in the SCR catalyst according
to the invention.

| Structure | Molecular Sieve |
|---|---|
|  | SAPO-35 |
|  | ZK-20 |
| ERI | Erionite |
|  | ZSM-34 |
|  | Linde type T |
| DDR | Deca-dodecasil 3R |
|  | Sigma-1 |
| KFI | ZK-5 |
|  | 18-crown-6 |
|  | [Zn—Ga—As—O]-KFI |
| EAB | TMA-E |
| PAU | ECR-18 |
| MER | Merlinoite |
| AEI | SSZ-39 |
| GOO | Goosecreekite |
| YUG | Yugawaralite |
| GIS | P1 |
| VNI | VPI-9 |

In particular embodiments, the second molecular sieve (either a zeolite or a non-zeolite molecular sieve) component can be a medium pore, large pore or meso-pore size molecular sieve.

In particularly preferred embodiments, the first molecular sieve is a CuCHA material and the second molecular sieve is a FeBEA, FeFER, FeCHA or FeMFI (e.g. ZSM-5) wherein the Fe is impregnated, ion-exchanged and/or present within the crystal lattice of the molecular sieve.

By "medium pore" herein we mean a molecular sieve containing a maximum ring size of ten (10) and by "large pore" herein we mean containing a maximum ring size of twelve (12) tetrahedral atoms. Meso-pore molecular sieves have a maximum ring size of >12.

Suitable medium pore molecular sieves for use as second molecular sieves in the present invention include ZSM-5 (MFI), MCM-22 (MWW), AlPO-11 and SAPO-11 (AEL), AlPO-41 and SAPO-41 (AFO), ferrierite (FER), Heulandite or Clinoptilolite (HEU). Large pore molecular sieves for use in the present invention include zeolite Y, such as ultrastable-Y (or USY), faujasite or SAPO-37 (FAU), AlPO-5 and SAPO-5 (AFI), SAPO-40 (AFR), AlPO-31 and SAPO-31 (ATO), Beta (BEA), Gmelinite (GME), mordenite (MOR) and Offretite (OFF).

It will be appreciated from comments in WO 2008/132452 that the use of certain medium and large pore molecular sieves, such as ZSM-5 zeolite or Beta zeolite, can result in catalyst coking. Selection of certain medium and large pore molecular sieve components may be inappropriate for some applications: essentially a balance is being struck between improved transient response on the one hand and coking issues on the other. However, it may be possible to reduce or avoid such coking problems with appropriate exhaust system design, e.g. location of an oxidation catalyst upstream of the SCR catalyst which can convert some hydrocarbons in the feed gas that could otherwise have coked medium, large or meso-pore molecular sieve components. It is also possible in certain embodiments where a small pore molecular sieve is combined with a medium, large or meso-pore molecular sieve that the presence of the small pore molecular sieve reduces the coking on the medium, large or meso-pore molecular sieve. Another benefit of this arrangement is that a ratio of NO:NO$_2$ in feed gas contacting the catalyst can be adjusted to improve total NO$_x$ conversion on the SCR catalyst.

Molecular sieves for use in the present invention can be independently selected from one-dimensional, two-dimensional and three-dimensional molecular sieves. Molecular sieves showing three-dimensional dimensionality have a pore structure, which is interconnected in all three crystallographic dimensions, whereas a molecular sieve having two-dimensional dimensionality has pores which are interconnected in two crystallographic dimensions only. A molecular sieve having one-dimensional dimensionality has no pores that are interconnected from a second crystallographic dimension.

Small pore molecular sieves, particularly aluminosilicate zeolites, for use in the present invention can have a silica-to-alumina ratio (SAR) of from 2 to 300, optionally 4 to 200 such as 8 to 150 e.g. 15 to 50 or 25 to 40. It will be appreciated that higher SARs are preferred to improve thermal stability (especially high catalytic activity at a low temperature after hydrothermal ageing) but this may negatively affect transition metal exchange. Therefore, in selecting preferred materials consideration can be given to SAR so that a balance may be struck between these two properties. SAR for iron-in-framework molecular sieves is discussed elsewhere in this description.

In preferred embodiments, the first molecular sieve, the second molecular sieve or both the first and second molecular sieves contain one or more metal selected independently from the group consisting of Cr, Mn, Fe, Co, Ce, Ni, Cu, Zn, Ga, Mo, Ru, Rh, Pd, Ag, In, Sn, Re, Ir and Pt. The metal contained in the first molecular sieve can be the same or different from that of the second molecular sieve. So for example, the first molecular sieve can contain copper and the second molecular sieve can contain iron. In one embodiment, the two molecular sieves can be ion-exchanged together.

It will be appreciated, e.g. from Table 1 hereinabove that by "molecular sieves containing one or more transition metal" herein we intend to cover molecular sieves wherein elements other than aluminium and silicon are substituted into the framework of the molecular sieve. Such molecular sieves are known as "non-zeolitic molecular sieves" and include "SAPO", "MeAPO", "FeAPO", "AlPO$_4$", "TAPO", "ELAPO", "MeAPSO" and "MeAlPO" which are substituted with one or more metals. Suitable substituent metals include one or more of, without limitation, As, B, Be, Co, Fe, Ga, Ge, Li, Mg, Mn, Ti, Zn and Zr. Such non-zeolitic molecular sieves can in turn be impregnated by suitable metals listed hereinabove, i.e. Cr, Mn, Fe, Co etc. One or both of the first and second molecular sieves can contain substituent framework metals. Where both the first and the second molecular sieves contain substituent framework metals, the or each substituent metal is selected independently from the above list.

In a particular embodiment, the small pore zeolites and non-zeolite molecular sieves for use in the present invention can be selected from the group consisting of aluminosilicate zeolites, metal-substituted aluminosilicate molecular sieves, such as the preferred iron-containing aluminosilicate zeolites and aluminophosphate molecular sieves.

Aluminophosphate molecular sieves with application in the present invention include aluminophosphate (AlPO$_4$) molecular sieves, metal substituted aluminophosphate molecular sieves (MeAlPO), silico-aluminophosphate (SAPO) molecular sieves and metal substituted silico-aluminophosphate (MeAPSO) molecular sieves.

A particularly interesting group of molecular sieve components for use either as a first or a second molecular sieve component are iron substituted aluminosilicates, i.e. where iron is present in the framework of the molecular sieve. In the preferred application of the SCR catalysts for use in the present invention, i.e. for treating exhaust gas from a mobile $NO_x$ source, iron-substituted aluminosilicates are particularly interesting because they produce relatively low or no $N_2O$, which is a powerful "greenhouse" gas.

In one embodiment, the at least one transition metal is selected from the group consisting of Cr, Ce, Mn, Fe, Co, Ni and Cu. In a preferred embodiment, the at least one transition metal is selected from the group consisting of Cu, Fe and Ce. In a particular embodiment, the at least one transition metal consists of Cu. In another particular embodiment, the at least one transition metal consists of Fe. In a further particular embodiment, the at least one transition metal is Cu and/or Fe.

The total of the at least one transition metal that can be included in the at least one transition metal-containing molecular sieve can be from 0.01 to 20.00 wt %, based on the total weight of the molecular sieve catalyst containing at least one transition metal. In one embodiment, the total of the at least one transition metal that can be included can be from 0.1 to 10.0 wt %. In a particular embodiment, the total of the at least one transition metal that can be included is from 0.5 to 5.0 wt %. In preferred embodiments, the transition metal loading is from 2.0 to 4.0 wt % and the SAR is 25 to 50 or >40 or >60 e.g. 40<100, 40<70 or 60<100, provided that for iron-in-framework molecular sieves the $SiO_2/Fe_2O_3$ ratio is met (where present the $SiO_2/Fe_2O_3$ is 50 to 200, preferably 50 to 100).

Transition metals may be incorporated into the molecular sieves for use in the present invention using techniques well known in the art, including liquid-phase exchange or solid-ion exchange or by an incipient wetness process. For manufacture of iron-containing aluminosilicate zeolites see Journal of Catalysis 232(2) 318-334 (2005); EP2072128; and WO2009/023202 and references and search citations therein.

In a particularly preferred embodiment, the catalytic component comprises or consists of a combination of a first molecular sieve that is a large pore molecular sieve and a second molecular sieve that is a small pore molecular sieve. In certain preferred embodiments, the small pore molecular sieve has a CHA framework, more preferably a SSZ-13 framework, and contains copper. In certain preferred embodiments, this small pore molecular sieve is combined with a large pore molecular sieve having a BEA framework. Preferably, the BEA framework contains either exchanged or free iron or is an iron isomorphous BEA molecular structure (also referred to as BEA-type ferrosilicate), with iron isomorphous BEA molecular structure being particularly preferred.

In certain preferred embodiments, the iron isomorphous BEA molecular structure is crystalline silicate having (1) an iron-containing BEA-framework structure that has a $SiO_2/Fe_2O_3$ mol ratio of about 20 to about 300, and (2) at least 80% of the contained iron is isolated iron ions $Fe^{3+}$ in a fresh state and/or $\log(SiO_2/Al_2O_3)$ by mol is at least about 2. Preferred BEA-type ferrosilicates useful in the present invention have a composition represented by following formula:

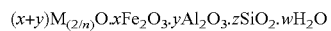

wherein n is an atomic value of cation M; x, y, and z represent mol fractions of $Fe_2O_3$, $Al_2O_3$ and $SiO_2$, respectively; x+y+z=1; w is a number of at least 0; z/x is 20 to 300, y may be 0, and optionally z/y is at least 100.

Preferably, iron-containing BEA-framework structure that has a $SiO_2/Fe_2O_3$ mol ratio of about 25 to about 300, about 20 to about 150, about 24 to about 150, about 25 to about 100, or about 50 to about 80. The upper limit of $\log(SiO_2/Al_2O_3)$ by mol is not particularly limited, provided that the $\log(SiO_2/Al_2O_3)$ by mol is at least 2 (i.e., the $SiO_2/Al_2O_3$ ratio by mol is at least 100). The $\log(SiO_2/Al_2O_3)$ by mol is preferably at least 2.5 (i.e., the $SiO_2/Al_2O_3$ ratio by mol is at least 310), more preferably at least 3 (i.e., the $SiO_2/Al_2O_3$ ratio by mol is at least 1,000). When the $\log(SiO_2/Al_2O_3)$ by mol exceeds 4 (i.e., the $SiO_2/Al_2O_3$ ratio by mol becomes at least 10,000), the performance for nitrogen oxide reduction is constant at the highest level.

In certain preferred embodiments, the CHA molecular sieve is characterized as having a mean crystal size of greater than about 1 microns, preferably about 1 to about 5 microns, with about 2 to about 4 microns being most preferred. In the BEA-type ferrosilicate, the iron ingredient most prominently exhibiting a catalytic activity for the reduction of nitrogen oxides is not agglomerated as $Fe_2O_3$ but is dispersed as isolated iron ion $Fe^{3+}$ in the framework structure (i.e., isolated and dispersed in the silicate frame structure or ion exchange sites). The isolated iron ion Fe3+ can be detected by the electron spin resonance measurement. The $SiO_2/Fe_2O_3$ ratio by mol as used for defining the composition of the BEA-type ferrosilicate is an expedient expression for defining the whole iron content including isolated iron ion $Fe^{+3}$ in the BEA-type ferrosilicate.

The use of small/large pore zeolite blends, particularly copper exchanged SSZ-13/Fe-BEA combinations, can increase the formation of $N_2O$ as compared to the constituent components. Accordingly, the use of this combination can be detrimental in certain applications. However, the use of copper exchanged SSZ-13/BEA-type ferrosilicate combinations surprisingly overcame this problem and so offered improved selectivity to nitrogen. Zoned and layered SCR catalysts offer further improvements, particularly when the exhaust gas has about a 50/50 ratio of NO to $NO_2$. This catalyst reduces the $N_2O$ emissions by approximately 75% over the blended equivalent whilst retaining excellent transient response and good conversion in low $NO/NO_2$ gas mixes.

Surprisingly, combinations of copper exchanged SSZ-13/pre-aging Fe-BEA can produce results substantially better than combinations have conventional Fe-BEA. Accordingly, instead of the more conventional processing of aging at 500° C. for 1 hour, the Fe-BEA material is preferably aged at 600-900° C., preferably 650-850° C., more preferably 700-800° C., and even more preferably 725-775° C., for 3-8 hours, preferably 4-6 hours, more preferably from 4.5-5.5 hours, and even more preferably from 4.75-5.25 hours. Embodiments using copper exchanged SSZ-13/pre-aged Fe-BEA combinations are advantageous in applications in which the formation of $N_2O$ is undesirable. Included within the scope of this invention are ratios of Cu:SSZ-13 to pre-aged Fe-BEA similar to those of Cu:SSZ-13 to Fe-BEA and Cu:SSZ-13 to BEA-Ferrosilicate. Also included within the scope of the invention are combinations of Cu:SSZ-13 to pre-aged Fe-BEA similar to those of Cu:SSZ-13 to Fe-BEA and Cu:SSZ-13 to BEA-Ferrosilicate.

Both the first and second molecular sieves can be present in the same catalyst coating, i.e. coated in a washcoat onto a suitable substrate monolith or each of the first and second molecular sieve components may be separated in washcoat layers one above the other, with either the first molecular sieve component in a layer above the second molecular sieve component or vice versa. Alternatively, both the first and second molecular sieves can be combined in a composition for forming substrate monoliths of the extruded-type. Optionally, the extruded monolith can be further coated with a washcoat containing one or both of the first and second molecular sieve component(s). Further alternatives include forming an extruded substrate monolith comprising one, but not both, of the first and second molecular sieve components and coating the extruded substrate monolith with a washcoat containing the other molecular sieve component not present in the extrudate, or the washcoat can contain both the first and second molecular sieves. In all of the arrangements combining extruded and coated substrate monoliths, it will be understood that where a first and/or a second molecular sieve component is present in both the extrudate and the catalyst coating, the first molecular sieve component can be the same in both the extrudate and the coating, or different. So for example, the washcoat can contain SSZ-13 zeolite and the extrudate can contain SAPO-34. The same applies for the second molecular sieve component, e.g. the washcoat can contain ZSM-5 zeolite and the extrudate can contain Beta zeolite.

Washcoat compositions containing the molecular sieves for use in the present invention for coating onto the monolith substrate or for manufacturing extruded type substrate monoliths can comprise a binder selected from the group consisting of alumina, silica, (non zeolite) silica-alumina, naturally occurring clays, $TiO_2$, $ZrO_2$, and $SnO_2$.

Suitable substrate monoliths include so-called flow-through substrate monoliths (i.e. a honeycomb monolithic catalyst support structure with many small, parallel channels running axially through the entire part) made of ceramic materials such as cordierite; or metal substrates made e.g. of fecralloy. Substrate monoliths can be filters including wall-flow filters made from cordierite, aluminium titanate, silicon carbide or mullite; ceramic foams; sintered metal filters or so-called partial filters such as those disclosed in EP 1057519 or WO 01/080978.

According to another aspect, the invention provides an exhaust system for treating a flowing exhaust gas containing oxides of nitrogen from a mobile source of such exhaust gas, which system comprising a source of nitrogenous reducing agent arranged upstream in a flow direction from a SCR catalyst according to the invention.

The source of nitrogenous reducing agent can comprise a suitable injector means operated under control of e.g. a suitably programmed electronic control unit to deliver an appropriate quantity of reducing agent or a precursor thereof (held in a suitable vessel or tank) for converting $NO_x$ to a desired degree. Liquid or solid ammonia precursor can be urea $((NH_2)_2CO)$, ammonium carbonate, ammonium carbamate, ammonium hydrogen carbonate or ammonium formate, for example. Alternatively, ammonia per se or hydrazine can be used.

In an alternative embodiment, the source of nitrogenous reducing agent is a $NO_x$ absorber (also known as a $NO_x$ trap, lean $NO_x$ trap or $NO_x$ absorber catalyst (NAC)) in combination with an engine that is configured so that at least one engine cylinder can operate richer than normal operating conditions, e.g. in the remaining engine cylinders, e.g. to produce exhaust gas having a stoichiometrically balanced redox composition, or a rich redox composition and/or a separate hydrocarbon injector means arranged upstream of the $NO_x$ absorber for injecting hydrocarbons into a flowing exhaust gas. $NO_x$ absorbed on the $NO_x$ absorber is reduced to ammonia through contacting adsorbed $NO_x$ with the reducing environment. By locating the SCR catalyst according to the invention downstream of the $NO_x$ absorber, ammonia produced in situ can be utilised for $NO_x$ reduction on the SCR catalyst when the $NO_x$ absorber is being regenerated by contacting the $NO_x$ absorber with e.g. richer exhaust gas generated by the engine.

Alternatively, the source of nitrogenous reducing agent can be a separate catalyst e.g. a $NO_x$ trap or a reforming catalyst located in an exhaust manifold of each of at least one engine cylinder which is configured to operate, either intermittently or continuously, richer than normal.

In a further embodiment, an oxidation catalyst for oxidising nitrogen monoxide in the exhaust gas to nitrogen dioxide can be located upstream of a point of metering the nitrogenous reductant into the exhaust gas and the SCR catalyst.

The oxidation catalyst can include at least one precious metal, preferably a platinum group metal (or some combination of these), such as platinum, palladium or rhodium, coated on a flow-through monolith substrate. In one embodiment, the at least one precious metal is platinum, palladium or a combination of both platinum and palladium or an alloy of Pd—Au, optionally in combination with Pt—Pd. The precious metal can be supported on a high surface area washcoat component such as alumina, an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the catalyst according to the invention. Filter substrates can be selected from any of those mentioned above, e.g. wall flow filters. Where the filter is catalysed, e.g. with an oxidation catalyst of the kind discussed above, preferably the point of metering nitrogenous reductant is located between the filter and the catalyst according to the invention. It will be appreciated that this arrangement is disclosed in WO 99/39809. Alternatively, if the filter is uncatalysed, the means for metering nitrogenous reductant can be located between the oxidation catalyst and the filter.

In a further embodiment, the SCR catalyst for use in the present invention is coated on a filter or is in the form of an extruded-type catalyst located downstream of the oxidation catalyst. Where the filter includes the SCR catalyst for use in the present invention, the point of metering the nitrogenous reductant is preferably located between the oxidation catalyst and the filter.

According to a further aspect, the invention provides a lean-burn internal combustion engine comprising an exhaust system according to the invention. In certain embodiments, the engine can be a compression ignition engine or a positive ignition engine. Positive ignition engines can be fuelled using a variety of fuels including gasoline fuel, gasoline fuel blended with oxygenates including methanol and/or ethanol, liquid petroleum gas or compressed natural gas. Compression ignition engines can be fuelled using diesel fuel, diesel fuel blended with non-diesel hydrocarbons including synthetic hydrocarbons produced by gas-to-liquid methods or bio-derived components.

In yet another aspect, the invention provides a vehicle comprising a lean-burn internal combustion engine according to the invention.

In a further aspect, the invention provides a method of converting oxides of nitrogen ($NO_x$) in an exhaust gas of a mobile source whose composition, flow rate and temperature of which exhaust gas are each changeable temporally, which method comprising the step of by contacting the $NO_x$ with a nitrogenous reducing agent in the presence of a selective catalytic reduction catalyst comprising a combination of a first molecular sieve component and a second molecular sieve component, wherein in a direct comparison tested on the Federal Test Procedure (FTP) 75 cycle the catalyst has a higher cumulative conversion of $NO_x$ at equal or lower $NH_3$ slip than either molecular sieve component taken alone.

In one embodiment, the catalyst has a higher cumulative conversion of $NO_x$ at equal or lower $NH_3$ slip than either molecular sieve component taken alone where the cumulative molar $NO:NO_2$ ratio in feed gas entering said catalyst is equal to, or less than 1.

In another embodiment, the catalyst has a higher cumulative conversion of $NO_x$ to dinitrogen at equal or lower $NH_3$ slip than either molecular sieve component taken alone.

In a further embodiment, the nitrogen oxides are reduced with the nitrogenous reducing agent at a temperature of at least 100° C. In another embodiment, the nitrogen oxides are reduced with the reducing agent at a temperature from about 150° C. to 750° C. The latter embodiment is particularly useful for treating exhaust gases from heavy and light duty diesel engines, particularly engines comprising exhaust systems comprising (optionally catalysed) diesel particulate filters which are regenerated actively, e.g. by injecting hydrocarbon into the exhaust system upstream of the filter, wherein the catalyst according to the present invention is located downstream of the filter.

In a particular embodiment, the temperature range is from 175 to 550° C. In another embodiment, the temperature range is from 175 to 400° C.

In another embodiment, the nitrogen oxides reduction is carried out in the presence of oxygen. In an alternative embodiment, the nitrogen oxides reduction is carried out in the absence of oxygen.

The gas containing the nitrogen oxides can contact the catalyst according to the invention at a gas hourly space velocity of from 5,000 $hr^{-1}$ to 500,000 $hr^{-1}$, optionally from 10,000 $hr^{-1}$ to 200,000 $hr^{-1}$.

The metering of the nitrogenous reducing agent contacting the SCR catalyst can be arranged such that 60% to 200% of theoretical ammonia is present in exhaust gas entering the SCR catalyst calculated at 1:1 $NH_3/NO$ and 4:3 $NH_3/NO_2$.

In a further embodiment, a step of oxidising nitrogen monoxide in the exhaust gas to nitrogen dioxide can be performed prior to introduction of any nitrogenous reducing agent. Suitable, such NO oxidation step can be done using a suitable oxidation catalyst. In one embodiment, the oxidation catalyst is adapted to yield a gas stream entering the SCR catalyst having a ratio of NO to $NO_2$ of from about 4:1 to about 1:3 by volume, e.g. at an exhaust gas temperature at oxidation catalyst inlet of 250° C. to 450° C.

In order that the invention may be more fully understood, reference is made to the accompanying drawings, in which.

FIGS. 5, 6a, 6b, 7, and 8a-8c are graphs showing data associated with certain embodiments of the invention.

Figure 1:
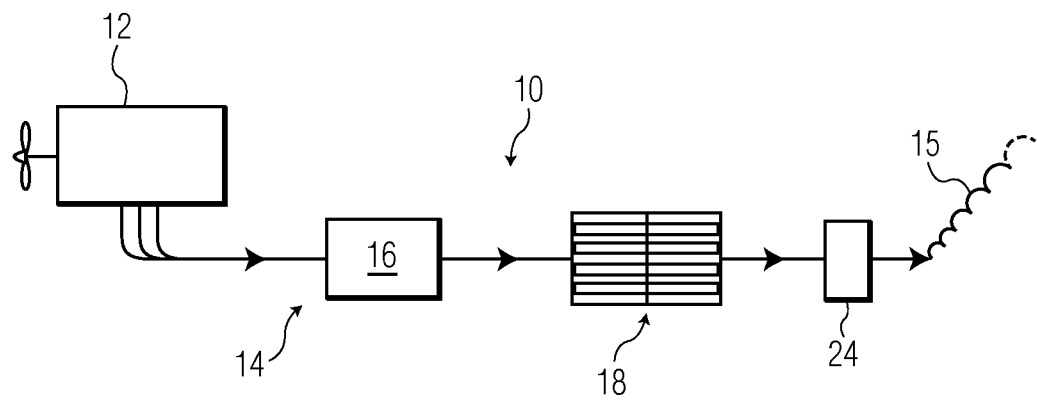
FIG. 1 is a schematic drawing of an exhaust system embodiment according to the invention.

In FIG. 1 is shown an apparatus 10 comprising a light-duty diesel engine 12 and an exhaust system 14 comprising a conduit for conveying exhaust gas emitted from the engine to atmosphere 15 disposed in which conduit is a metal substrate monolith coated with a $NO_x$ Absorber Catalyst ((NAC)) also known as a $NO_x$ trap or lean $NO_x$ trap) 16 followed in the flow direction by a wall-flow filter 18 coated with a SCR catalyst according to the invention (Cu/SSZ-13 blended with an iron-in-zeolite framework BEA also ion-exchanged with additional ion-exchanged iron). A clean-up catalyst 24 comprising a relatively low loading of Pt on alumina is disposed downstream of wall-flow filter 18.

In use, the engine runs lean of stoichiometric, wherein $NO_x$ is absorbed in the NAC. Intermittently, the engine is run rich to desorb and reduce $NO_R$. During rich running operation, some $NO_x$ is reduced to $NH_3$ and is stored on the downstream SCR catalyst for further $NO_x$ reduction. The SCR catalyst also treats $NO_x$ during intermittent rich events. NO oxidised to $NO_2$ on the NAC is used to combust soot trapped on the filter 18 passively. The NAC is also used to combust additional hydrocarbon during occasional forced (active) regenerations of the filter.

Figure 2:
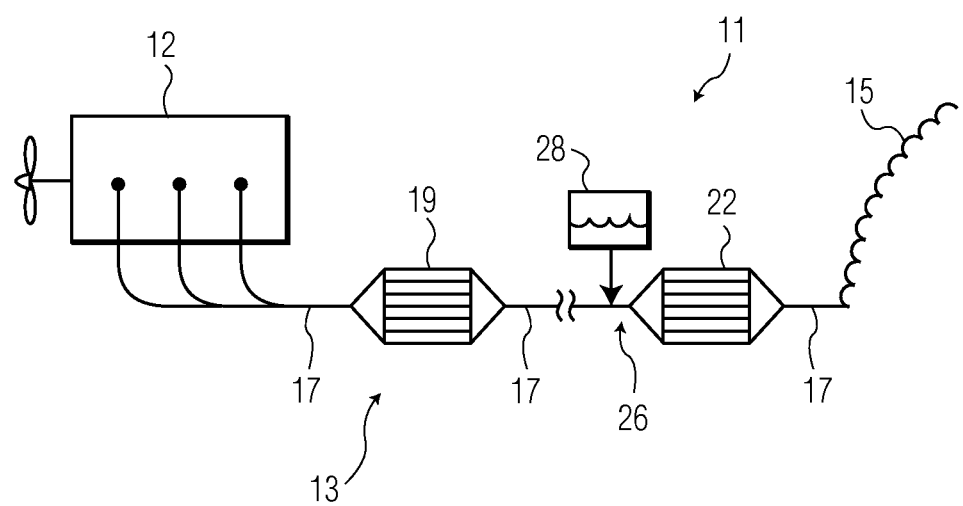
FIG. 2 is a schematic drawing of a further exhaust system embodiment according to the invention.

FIG. 2 shows an alternative apparatus 11 according to the invention comprising a diesel engine 12 and an exhaust system 13 therefor. Exhaust system 13 comprises a conduit 17 linking catalytic aftertreatment components, namely a $2Au-0.5Pd/Al_2O_3$ catalyst coated onto an inert ceramic flow-through substrate 19 disposed close to the exhaust manifold of the engine (the so-called close coupled position). Downstream of the close-coupled catalyst 19, in the so-called underfloor position, is an flow-through catalyst 22 of the extruded type comprising a mixture of an aluminosilicate CHA ion-exchanged with Cu and FeCHA, having Fe present in the molecular sieve framework structure. A source of nitrogenous reductant (urea) is provided in tank 28, which is injected into the exhaust gas conduit 17 between catalysts 19 and 22.

In certain embodiments, provided is a catalyst for selectively catalysing the conversion of oxides of nitrogen using a nitrogenous reductant in a feed gas whose composition, flow rate and temperature are each changeable temporally, which catalyst comprising a combination of a first molecular sieve component and a second molecular sieve component, wherein in a direct comparison tested on the Federal Test Procedure (FTP) 75 cycle the catalyst has a higher cumulative conversion of $NO_x$ at equal or lower $NH_3$ slip than either molecular sieve component taken alone.

Preferably, the catalyst has a higher cumulative conversion of $NO_R$, preferably to elemental nitrogen, at equal or lower $NH_3$ slip than either molecular sieve component taken alone where the cumulative molar $NO:NO_2$ ratio in feed gas entering said catalyst is equal to, or less than 1.

In certain embodiments, the SCR catalyst has the first molecular sieve component achieves the maximum $NO_x$ conversion at a lower $NH_3$ fill level for the conditions selected than the second molecular sieve component. Preferably, the lower $NH_3$ fill level of the first molecular sieve component is in the range of 10-80%.

In certain embodiments in the SCR catalyst, the first and second molecular sieves can be selected independently from zeolites and non-zeolite molecular sieves. Preferably, one of the molecular sieve components is a small pore molecular sieve containing a maximum ring size of eight (8) tetrahedral atoms, preferably selected from the group of Framework Type Codes consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, with CHA, LEV, ERI, DDR, KFI, EAB, PAU, MER, AEI, GOO, YUG, GIS and VNI being particularly preferred. Preferably, the other molecular sieve component is selected from a small pore, medium pore, large pore or meso-pore size molecular sieve. Preferred medium pore molecular sieve include MFI, MWW, AEL, AFO, FER and HEU. Preferred large pore molecular sieve include FAU, AFI, AFR, ATO, BEA, GME, MOR and OFF.

In certain embodiments, one or both of the first and second molecular sieves contains a substituent framework metal selected from the group consisting of As, B, Be, Co, Fe, Ga, Ge, Li, Mg, Mn, Ti, Zn and Zr. In certain embodiments, one or both of the first molecular sieve component and the second molecular sieve component contain one or more metal selected independently from the group consisting of Cr, Mn, Fe, Co, Ce, Ni, Cu, Zn, Ga, Mo, Ru, Rh, Pd, Ag, In, Sn, Re, Ir and Pt, preferably Cr, Ce, Mn, Fe, Co, Ni and Cu.

In one aspect of the invention, provided is an exhaust system for treating a flowing exhaust gas containing oxides of nitrogen from a mobile source of such exhaust gas, which system comprising a source of nitrogenous reducing agent arranged upstream in a flow direction from a selective catalytic reduction catalyst described herein. In certain embodiments, the system further comprises an oxidation catalyst disposed upstream of the source of nitrogenous reducing agent and the SCR catalyst. In certain embodiments, the system further comprises a filter disposed between the oxidation catalyst and the source of nitrogenous reducing agent.

In one aspect of the invention, provided is a lean-burn internal combustion engine, such as a compression ignition engine or a positive ignition engine, comprising an exhaust system described herein. In certain embodiments, the engine comprises a $NO_x$ absorber which functions, at least in part, as the source of a nitrogenous reducing agent.

In one aspect of the invention, provided is a vehicle comprising a lean-burn internal combustion engine described herein.

In one aspect of the invention, provided is a method for converting oxides of nitrogen ($NO_x$) in an exhaust gas of a mobile source the composition, flow rate and temperature of which exhaust gas are each changeable temporally, which method comprising the step of contacting the $NO_x$ with a nitrogenous reducing agent in the presence of a selective catalytic reduction catalyst comprising a combination of a first molecular sieve component and a second molecular sieve component, wherein in a direct comparison tested on the Federal Test Procedure (FTP) 75 cycle the catalyst has a higher cumulative conversion of $NO_x$ at equal or lower $NH_3$ slip than either molecular sieve component taken alone. In certain embodiments of the method, the catalyst has a higher cumulative conversion of $NO_x$, preferably to dinitrogen, at equal or lower $NH_3$ slip than either molecular sieve component taken alone where the cumulative molar $NO:NO_2$ ratio in feed gas entering said catalyst is equal to, or less than 1. In certain embodiments of the method, the $NO_x$ is converted at a temperature of at least 100° C., preferably from about 150° C. to 750° C. In certain embodiments of the method, the gas containing the $NO_x$ contacts the SCR catalyst at a gas hourly space velocity of from 5,000 $hr^{-1}$ to 500,000 $hr^{-1}$. In certain embodiments, about 60% to about 200% of theoretical ammonia contacts the SCR catalyst calculated at 1:1 $NH_3/NO$ and 4:3 $NH_3/NO_2$. In certain embodiments of the method, the $NO:NO_2$ ratio in gas contacting the SCR catalyst is from about 4:1 to about 1:3 by volume.

The following Examples are provided by way of illustration only.

EXAMPLES

Example 1

Method of Making Fresh 3 Wt % Cu/SSZ-13 (Aluminosilicate CHA) Catalysts

Commercially available SSZ-13 zeolite (CHA) was $NH_4^+$ ion exchanged in a solution of $NH_4NO_3$, then filtered. The resulting materials were added to an aqueous solution of $Cu(NO_3)_2$ with stirring. The slurry was filtered, then washed and dried. The procedure can be repeated to achieve a desired metal loading. The final product was calcined. The materials prepared according to this Example are referred to herein as "fresh".

Example 2

Method of Making Fresh 5 Wt % Fe/Beta Catalyst

Commercially available Beta zeolite was $NH_4^+$ ion exchanged in a solution of $NH_4NO_3$, then filtered. The resulting material was added to an aqueous solution of $Fe(NO_3)_3$ with stirring. The slurry was filtered, then washed and dried. The procedure can be repeated to achieve a desired metal loading. The final product was calcined. The materials prepared according to this Example are referred to herein as "fresh".

Example 3

Catalyst Mixtures

Separate physical blends of fresh and aged 1:3 Fe/Beta:Cu/SSZ-13 by weight were prepared by physical mixture of samples made according to Examples 1 and 2. Likewise physical blends of 1:3 BEA-Ferrosilicate:CuSSZ-13 by weight were prepared.

Example 4

$NO_x$ Conversion Activity Tests

Figure 3:
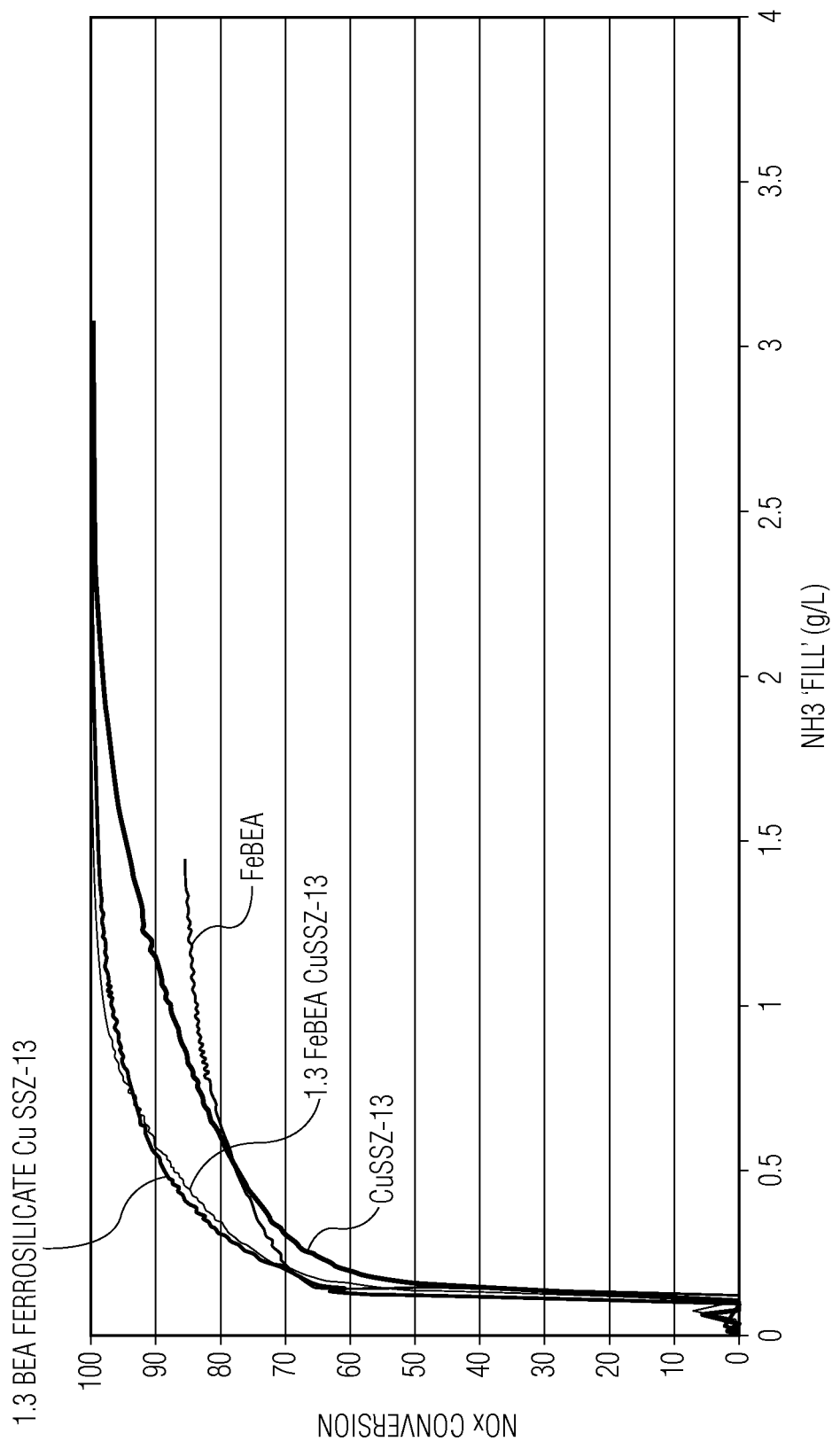
FIG. 3 is a graph showing the results of $NO_x$ conversion activity tests described in Example 3 on fresh catalysts prepared according to Examples 1, 2 and 3.
Figure 4A:
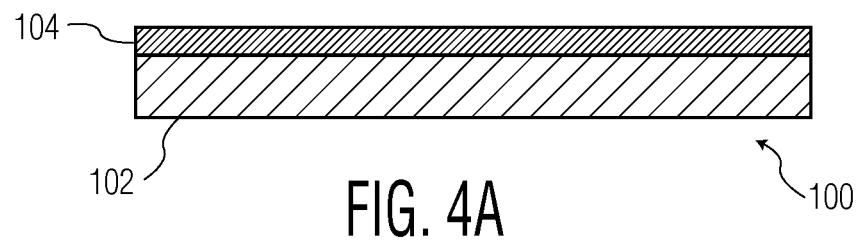
FIGS. 4a-4d shows different types of combinations of a first molecular sieve and a second molecular sieve on a substrate.
Figure 4B:
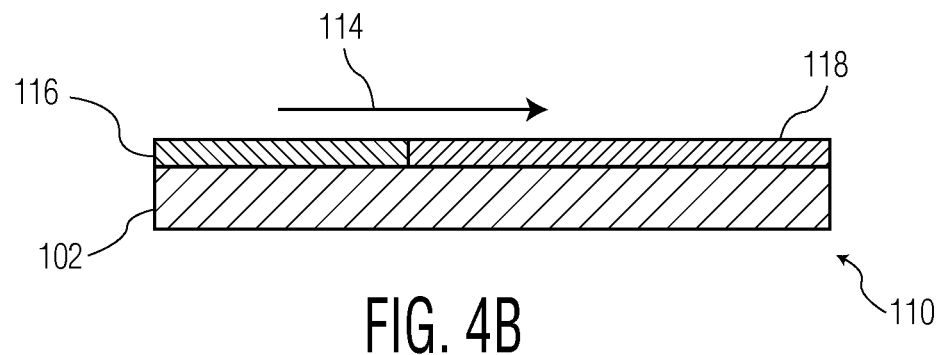
Figure 4C:
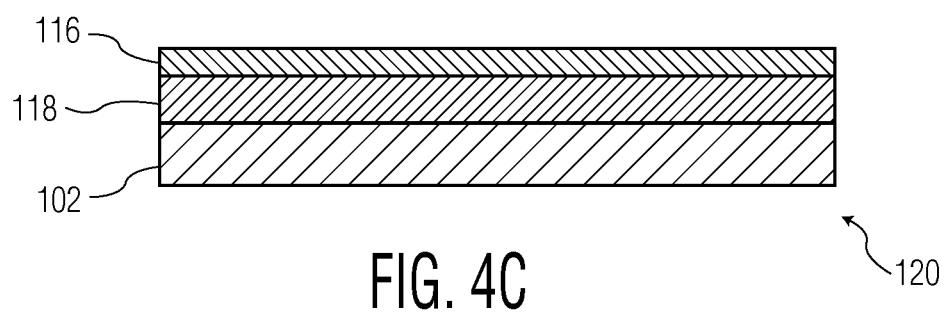
Figure 4D:
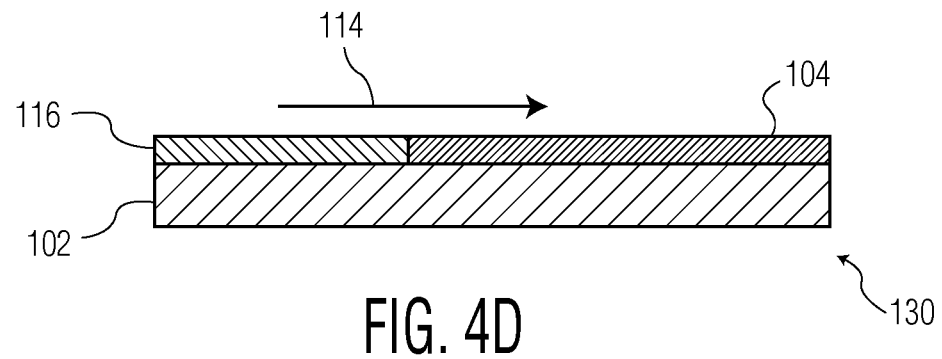

The activity of the fresh powder samples prepared according to Examples 1, 2 and 3 were tested at 250° C. in a laboratory apparatus using the following gas mixture: 125 ppm NO, 375 ppm $NO_2$ 750 ppm $NH_3$, 14% $O_2$, 4.5% $H_2O$, 4.5% $CO_2$, $N_2$ balance at a space velocity of 60,000 $hr^{-1}$. The test is stopped when 20 ppm $NH_3$ is detected downstream of the sample. The results are shown in FIG. 3.

From the results it can be seen that the Fe/Beta sample has a fast transient response, but limited maximum conversion. It also slips $NH_3$ early on in the test compared with the Cu/SSZ-13 and Fe/Beta+Cu/SSZ-13 blend. Transient response is defined as the rate at which NOx conversion increases as the level of $NH_3$ fill on the catalyst increases. The Cu/SSZ-13 has better, higher maximum conversion but a slower transient response. The combination of Fe/Beta and Cu/SSZ-13 gives fast transient response, higher maximum conversion, but also has higher conversion than the individual components at intermediate $NH_3$ fill levels, which is evidence of synergy. Pre-aged 1:3 Fe/Beta:Cu/SSZ-13 will provide improved results as well.

Example 5

Comparison of Blends, Layers, and Zones Combinations

Figure 5:
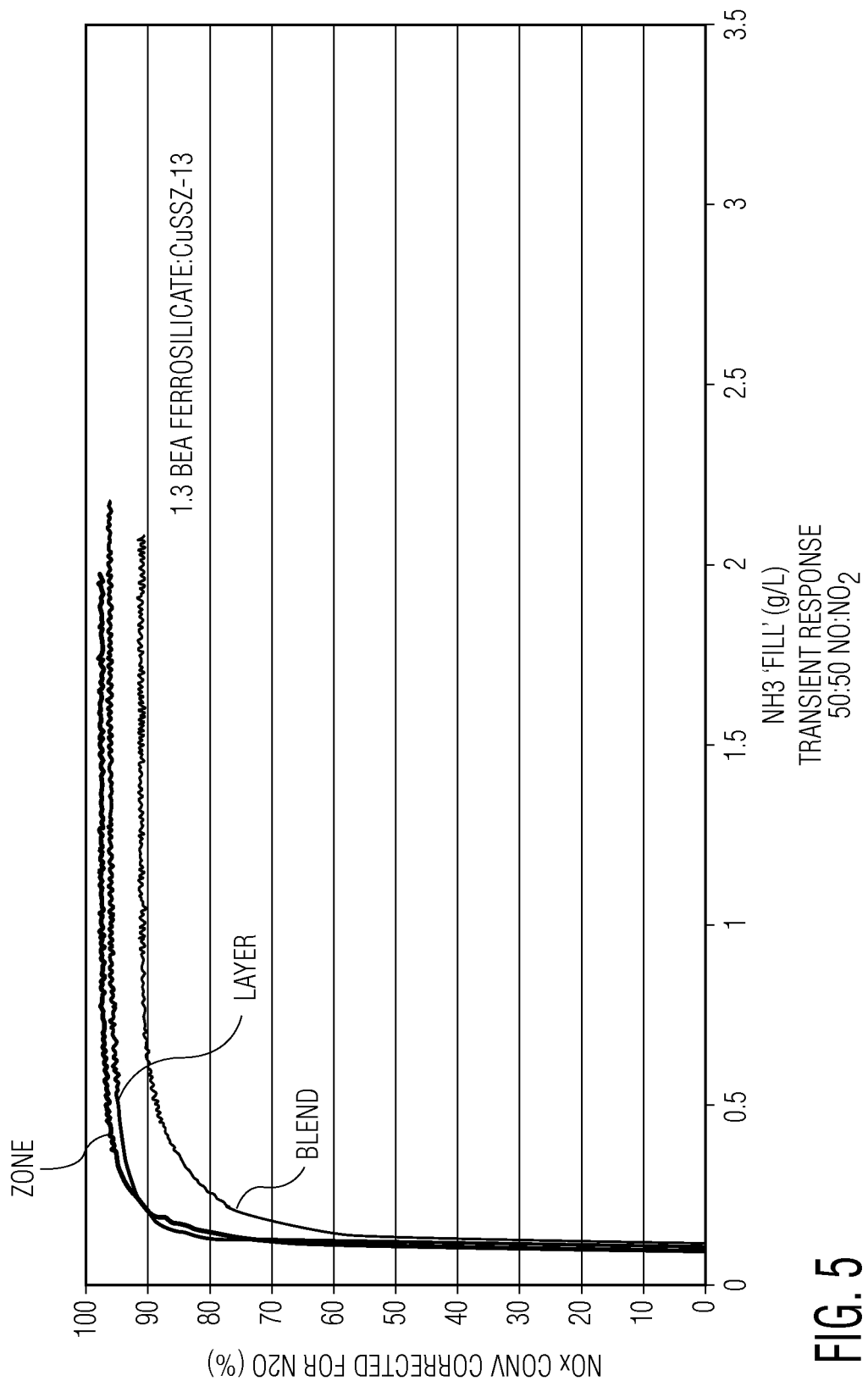

Three samples of a 1:3 (by weight) BEA-Ferrosilicate:CuSSZ-13 combination were prepared and separately coated on substrates as a blend, zones, and layers. The three coated substrates were exposed to a test environment similar to that described in Example 4, except that the NO:NO$_2$ ration was about 50:50. The results are shown in FIG. 5.

From the results it can be seen that zones and blends achieve higher NOx conversion compared to blends.

Example 6

N$_2$O Formation

Figure 6A:
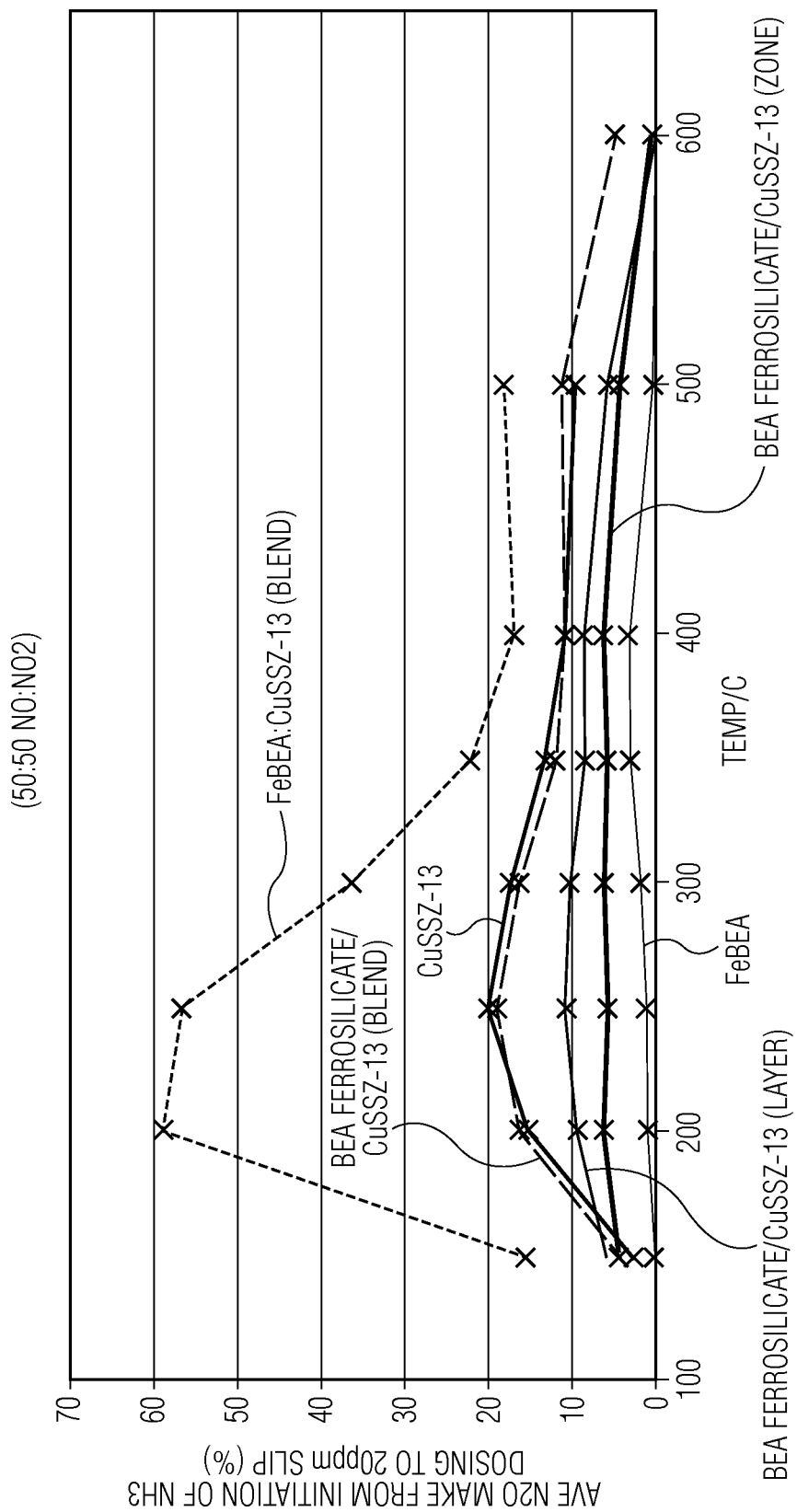
Figure 6B:
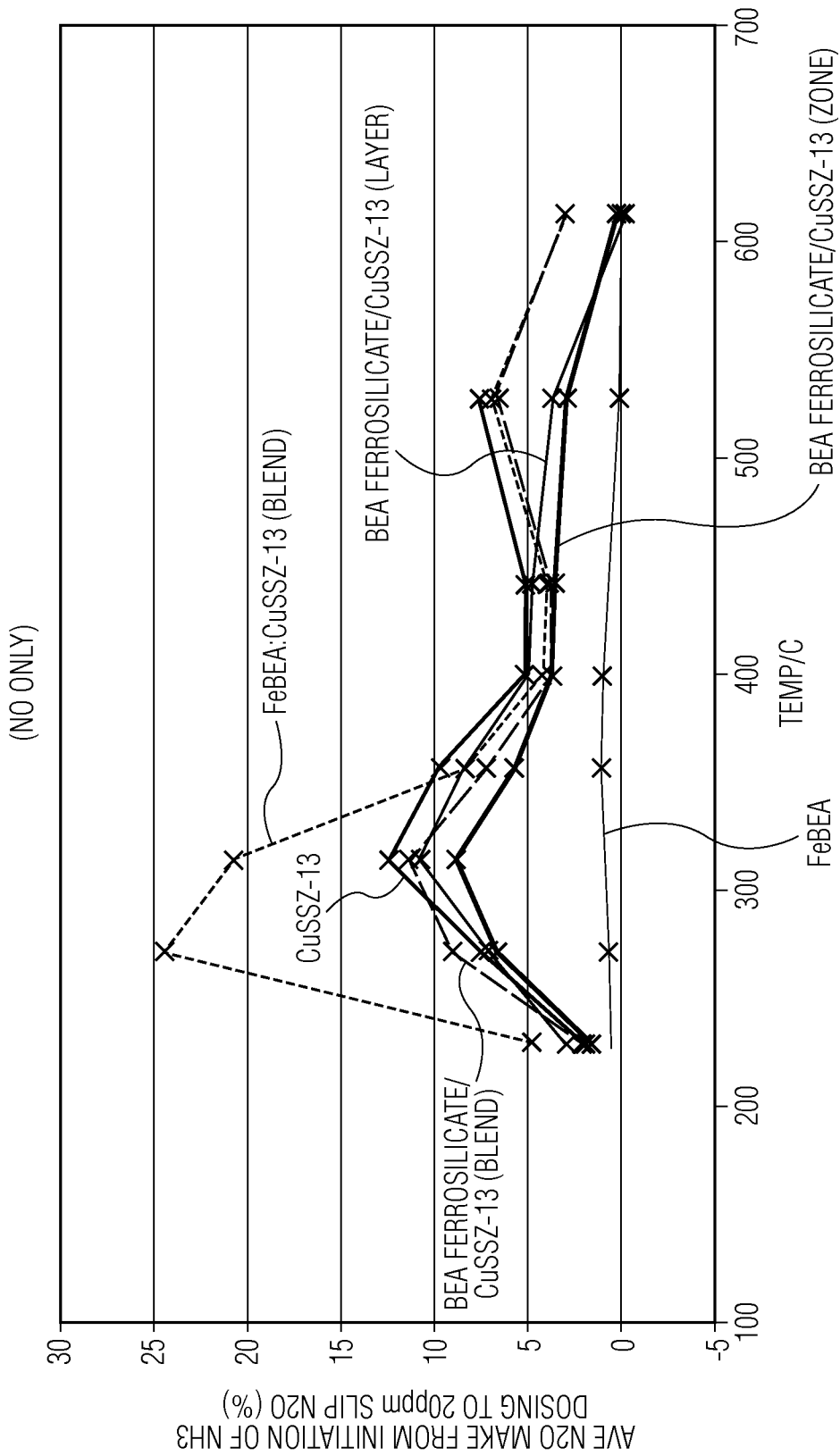
Figure 7:
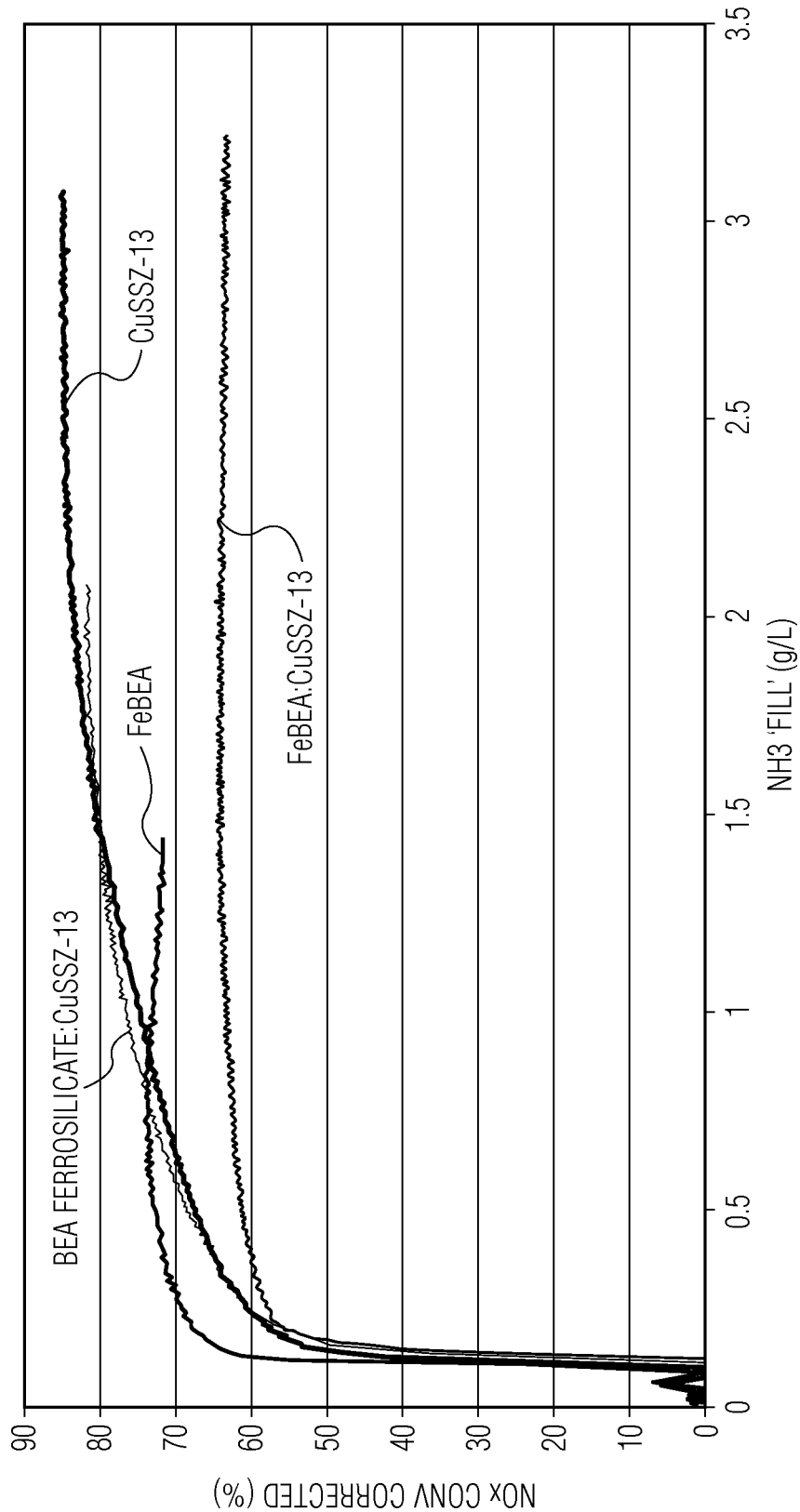

A samples of a 1:3 (by weight) FeBEA:CuSSZ-13 combination and three samples of a 1:3 (by weight) BEA-Ferrosilicate:CuSSZ-13 combination were prepared and separately coated on substrates. The FeBEA:CuSSZ-13 combination was coated as a blend, whereas the samples of BEA-Ferrosilicate:CuSSZ-13 combination were separately coated as a blend, zones, and layers. Each of the samples were exposed to a simulated diesel gas exhaust combined with NH$_3$ dosing (20 ppm slip). The average N$_2$O formation during exposure was recorded and is shown in FIGS. 6a and 6b.

It is clear that the FeBEA:CuSSZ-13 blend produces significant N$_2$O resulting in an apparent reduction in maximum conversion and 'N$_2$ selective' transient response. This reduction in conversion also outweighs that observed for the two components evaluated independently. Surprisingly, the BEA-Ferrosilicate:CuSSZ-13 blend produces substantially less N$_2$O than that observed for any other CuSSZ-13/zeolite blend. However, layers and zones of BEA-Ferrosilicate:CuSSZ-13 maintain the low N$_2$O make observed for the blend, but also show improved transient response under different NO$_2$ levels (see FIG. 7).

Example 7

Effect of NO:NO2 Ratios

Four samples of BEA-Ferrosilicate:CuSSZ-13 were prepared and tested for NOx conversion capacity during exposure to simulated diesel exhaust gas combined with a NH$_3$ reductant. Testing was performed at 250° C. and gas hourly space velocity of about 60,000/hour. The results are provided in the table below. Here, the reference ("ref.") catalyst is CuSSZ-13, "low fill" refers to an NH$_3$ level at less than about 0.5 g/L of exhaust gas, and "high fill" refers to an NH$_3$ at greater about 1 g/L of exhaust gas.

|  | 0% NO$_2$ | 50% NO$_2$ | 75% NO$_2$ |
|---|---|---|---|
| 3:1 BEA-Ferrosilicate:CuSSZ-13 (BLEND) | Better than ref | Better than ref | Similar at low fills, better at high fills |
| 1:1 BEA-Ferrosilicate:CuSSZ-13 (BLEND) | Poor at low fills, better at high fills than ref | Better than ref | Similar at low fills, better at high fills |
| 1:3 BEA-Ferrosilicate:CuSSZ-13 (ZONE) | Similar to ref | Much better than ref. Much better selectivity | Better than ref at low fills, similar at high fill |
| 1:3 BEA-Ferrosilicate layered over CuSSZ-13 | Similar to ref | Much better than ref. Much better selectivity | Better than ref at low fills, similar at high fill |

Example 8

Multiple Combinations

Figure 8A:
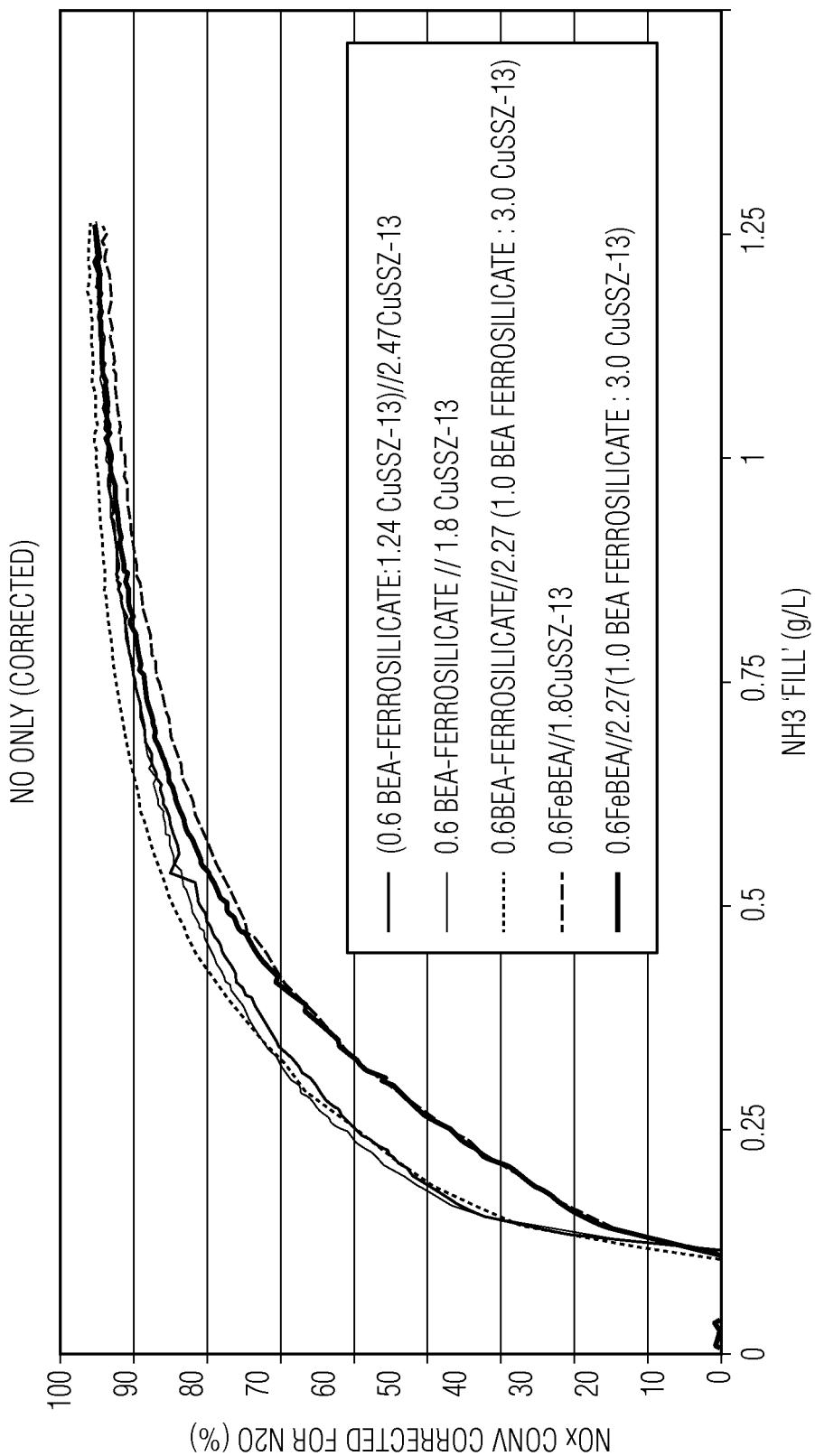
Figure 8B:
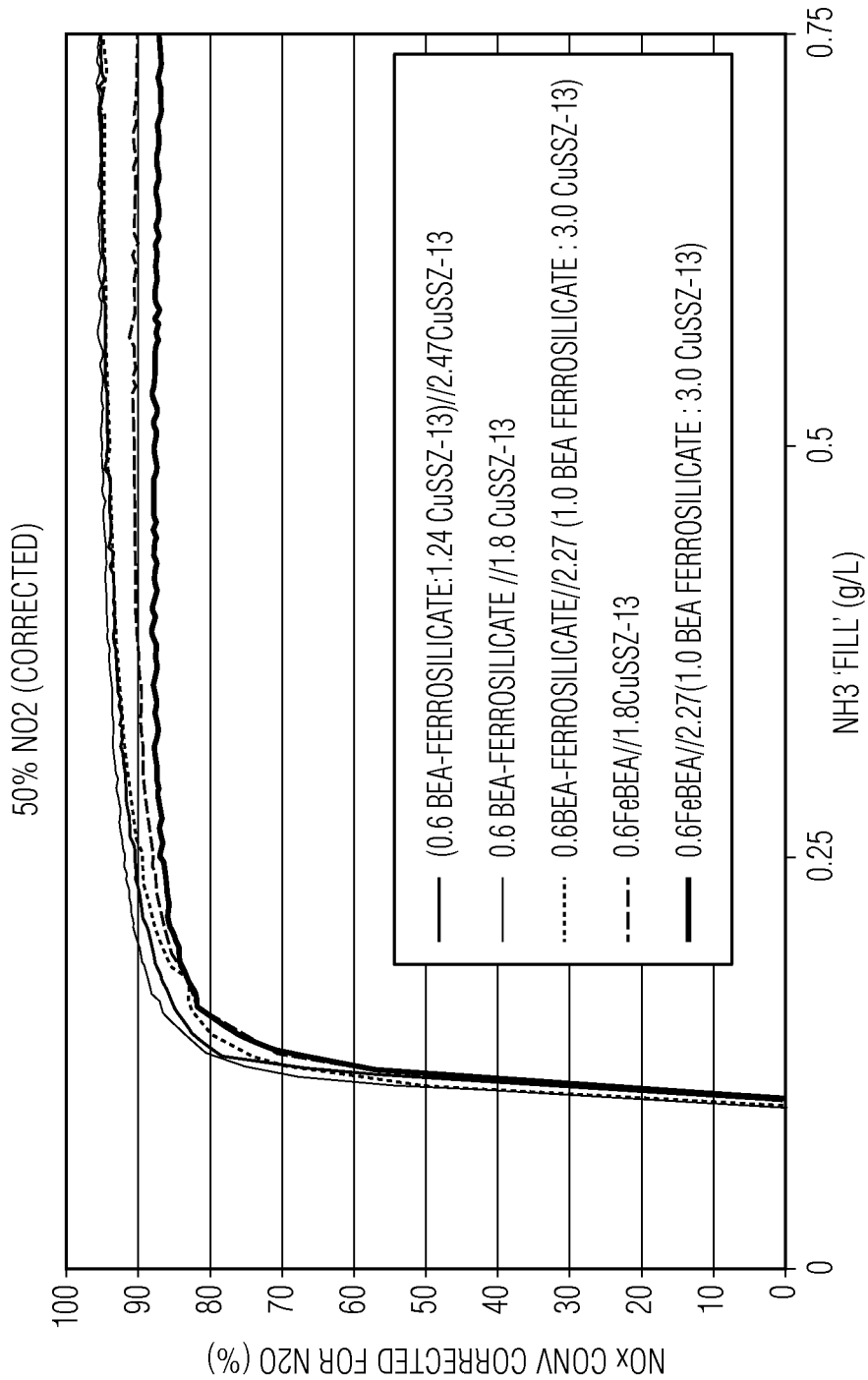
Figure 8C:
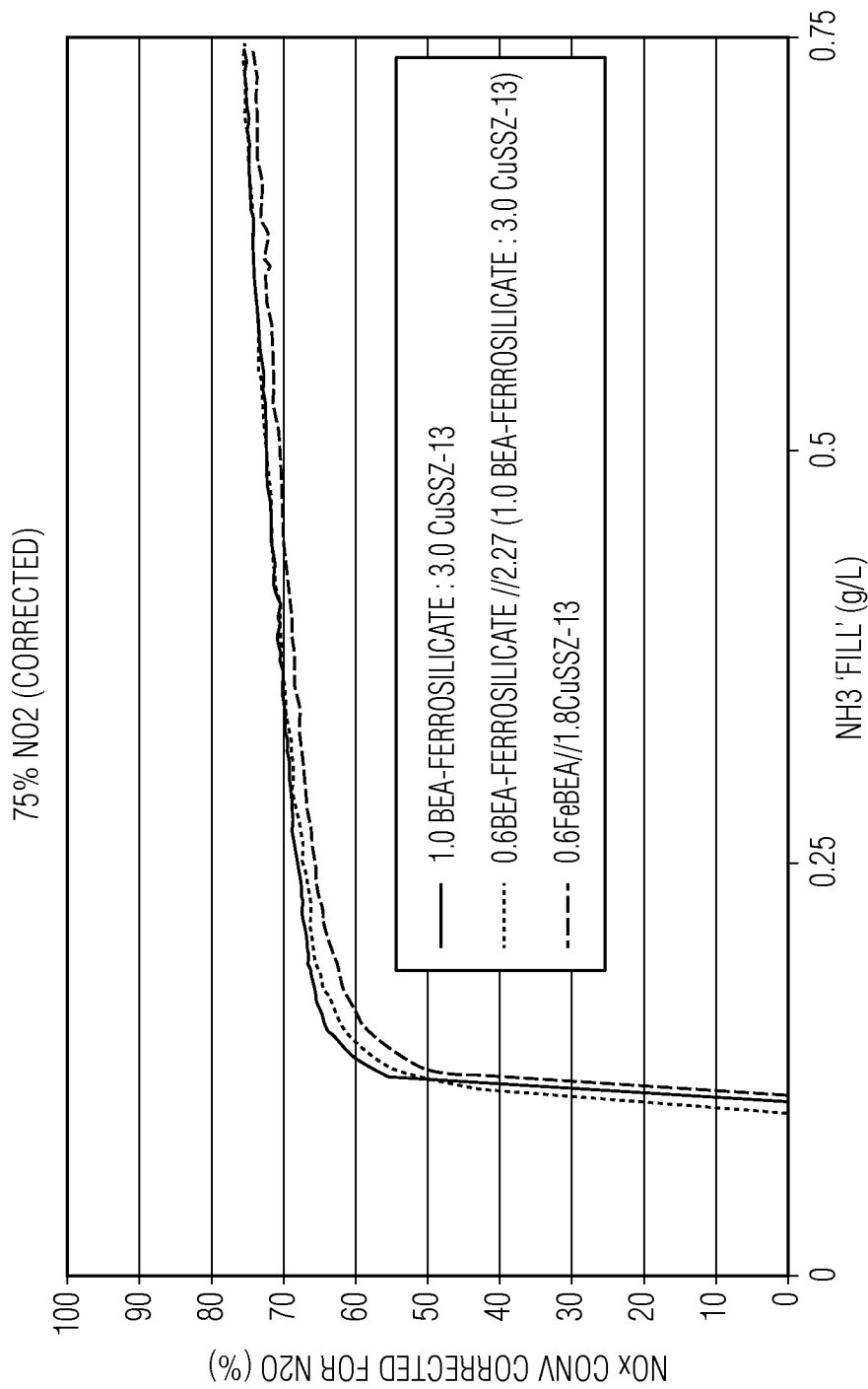

Samples of FeBEA, CuSSZ-13, and BEA-Ferrosilicate were prepared can combined in the indicated combinations and multiple combinations shown in FIGS. 8a-8c. In the legends, the ratios are give by weight, blends are shown in parenthesises, and zones are indicated by "//", with the first named component disposed upstream with respect to gas flow past the catalyst. Each of the combinations and multiple combinations were exposed to a simulated diesel gas exhaust gas stream containing an NH$_3$ reductant. The NO:NO$_2$ ratio in the exhaust gas was varied from only NO, 50:50 NO:NO$_2$ (by weight), and 75% NO$_2$ (by weight), to test the catalyst at different conditions. Each combination or multiple combination was evaluated for NO$_x$ conversion (corrected for N$_2$O formation) as a function of NH$_3$ fill level.

The invention claimed is:

1. A catalyst composition for treating exhaust gas comprising:
   (a) a first molecular sieve having BEA framework, wherein said first molecular sieve is a zeolite aluminociliate and contains about 0.5 to about 5 weight percent exchanged or free iron; and
   (b) a second molecular sieve having a small pore crystal structure and containing about 0.5 to about 5 weight percent of exchanged or free metal selected from Cr, Mn, Fe, Co, Ce, Ni, Cu, Zn, Ga, Mn, Ru, Rh, Pd, Pt, Ag, In, Sn, Re, and Ir, wherein the second molecular sieve is a zeolite aluminosilicate having a silica-to-alumina ratio of about 8 to about 150, wherein said first molecular sieve and said second molecular sieve are present in a weight ratio of about 0.1 to about 1.0.

2. The catalyst composition of claim 1, wherein said second metal is copper.

3. The catalyst composition of claim 2, wherein said second molecular sieve has a framework selected from CHA, AEI, AFX, and LEV.

4. The catalyst composition of claim 1, wherein said second molecular sieve contains about 2.0 to about 4.0 weight percent copper, and said first molecular sieve and said second molecular sieve are present in a weight ratio of about 0.2 to about 0.60.

5. A catalyst article comprising:
   a. a catalyst composition according to claim 1; and
   b. a monolith substrate onto or within which said catalytic composition is incorporated, wherein said first and second molecular sieves are present as a blend, a plurality of layers, or a plurality of zones.

6. The catalyst article of claim 5, wherein said first molecular sieve is disposed in a first zone and said second molecular sieve is disposed in a second zone, and wherein at least a portion of said first zone is upstream of said second zone relative to an intended direction of gas flow past or through said catalytic composition, a majority of said first zone does not overlap said second zone, and a majority of said second zone does not overlap said first zone.

7. The catalyst article of claim 5, wherein said first molecular sieve is disposed in a first zone and said second molecular sieve is disposed in a second zone, and wherein said second zone is disposed below said first zone relative to an intended direction of gas flow past or through said catalytic composition.

8. The catalyst article of claim 5, wherein said first and second molecular sieves are disposed on said substrate as a blend.

9. The catalyst of claim 3, wherein the second molecular sieve has a CHA framework.

10. The catalyst of claim 3, wherein the second molecular sieve has an AEI framework.

11. The catalyst of claim 3, wherein the second molecular sieve has an AEI framework.

12. The catalyst of claim 3, wherein the second molecular sieve has an AFX framework.

13. The catalyst of claim 3, wherein the second molecular sieve has a LEV framework.

14. A catalytic article comprising:
a. an extruded monolith comprising a first molecular sieve having a BEA framework, wherein said first molecular sieve is an aluminosilicate or an ferrosilicate and contains about 0.5 to about 5 weight percent exchanged or free iron; and
b. a washcoat comprising a second molecular sieve having a small pore crystal structure and containing about 0.5 to about 5 weight percent of exchanged or free metal selected from Cr, Mn, Fe, Co, Ce, Ni, Cu, Zn, Ga, Mo, Ru, Rh, Pd, Pt, Ag, in, Sn, Re, and Ir, wherein the second molecular sieve is a zeolite, wherein the washcoat is coated on the extruded monolith.

* * * * *